United States Patent
Cune et al.

(10) Patent No.: US 10,136,200 B2
(45) Date of Patent: Nov. 20, 2018

(54) DISTRIBUTED ANTENNA SYSTEM ARCHITECTURES

(71) Applicant: Corning Optical Communications LLC, Hickory, NC (US)

(72) Inventors: William Patrick Cune, Charlotte, NC (US); Bernhard Arthur Maria Deutsch, Hickory, NC (US); Jason Elliott Greene, Hickory, NC (US); Thomas Knuth, Berlin (DE)

(73) Assignee: Corning Optical Communications LLC, Hickory, NC (US)

( * ) Notice: Subject to any disclaimer, the term of this patent is extended or adjusted under 35 U.S.C. 154(b) by 0 days.

(21) Appl. No.: 15/472,926

(22) Filed: Mar. 29, 2017

(65) Prior Publication Data

US 2017/0201815 A1    Jul. 13, 2017

Related U.S. Application Data

(63) Continuation of application No. 14/518,574, filed on Oct. 20, 2014, now abandoned, which is a
(Continued)

(51) Int. Cl.
*H04B 10/2575* (2013.01)
*H04J 14/02* (2006.01)
(Continued)

(52) U.S. Cl.
CPC ... *H04Q 11/0071* (2013.01); *H04B 10/25753* (2013.01); *H04B 10/808* (2013.01);
(Continued)

(58) Field of Classification Search
CPC ............ H04J 14/0246; H04J 14/025; H04B 10/25753; H04B 10/25754
See application file for complete search history.

(56) References Cited

U.S. PATENT DOCUMENTS

| | | |
|---|---|---|
| 4,365,865 A | 12/1982 | Stiles |
| 4,449,246 A | 5/1984 | Seiler et al. |

(Continued)

FOREIGN PATENT DOCUMENTS

| | | |
|---|---|---|
| AU | 645192 B | 10/1992 |
| AU | 731180 B2 | 3/1998 |

(Continued)

OTHER PUBLICATIONS

Patent Cooperation Treaty, International Search Report for PCT/US2013/037090, dated Jul. 22, 2013, 4 pages.
(Continued)

*Primary Examiner* — Nathan Cors
(74) *Attorney, Agent, or Firm* — C. Keith Montgomery

(57) ABSTRACT

Optical fiber-based wireless systems and related components and methods are disclosed. The systems support radio frequency (RF) communications with clients over optical fiber, including Radio-over-Fiber (RoF) communications. The systems may be provided as part of an indoor distributed antenna system (IDAS) to provide wireless communication services to clients inside a building or other facility. The systems incorporate various functions, such as optical network terminal (ONT), splitter, and local powering, in antenna coverage areas.

15 Claims, 6 Drawing Sheets

Related U.S. Application Data continuation of application No. PCT/US2013/037090, filed on Apr. 18, 2013.

(60) Provisional application No. 61/638,219, filed on Apr. 25, 2012.

(51) Int. Cl.
  *H04Q 11/00* (2006.01)
  *H04B 10/80* (2013.01)
  *H04J 14/06* (2006.01)

(52) U.S. Cl.
  CPC ........ *H04J 14/025* (2013.01); *H04J 14/0246* (2013.01); *H04J 14/0278* (2013.01); *H04J 14/06* (2013.01); *H04Q 2011/0016* (2013.01)

(56) References Cited

U.S. PATENT DOCUMENTS

| | | |
|---|---|---|
| 4,573,212 A | 2/1986 | Lipsky |
| 4,665,560 A | 5/1987 | Lange |
| 4,867,527 A | 9/1989 | Dotti et al. |
| 4,889,977 A | 12/1989 | Haydon |
| 4,896,939 A | 1/1990 | O'Brien |
| 4,916,460 A | 4/1990 | Powell |
| 4,939,852 A | 7/1990 | Brenner |
| 4,972,346 A | 11/1990 | Kawano et al. |
| 5,039,195 A | 8/1991 | Jenkins et al. |
| 5,042,086 A | 8/1991 | Cole et al. |
| 5,056,109 A | 10/1991 | Gilhousen et al. |
| 5,059,927 A | 10/1991 | Cohen |
| 5,125,060 A | 6/1992 | Edmundson |
| 5,187,803 A | 2/1993 | Sohner et al. |
| 5,189,718 A | 2/1993 | Barrett et al. |
| 5,189,719 A | 2/1993 | Coleman et al. |
| 5,206,655 A | 4/1993 | Caille et al. |
| 5,208,812 A | 5/1993 | Dudek et al. |
| 5,210,812 A | 5/1993 | Nilsson et al. |
| 5,260,957 A | 11/1993 | Hakimi |
| 5,263,108 A | 11/1993 | Kurokawa et al. |
| 5,267,122 A | 11/1993 | Glover et al. |
| 5,268,971 A | 12/1993 | Nilsson et al. |
| 5,278,690 A | 1/1994 | Vella-Coleiro |
| 5,278,989 A | 1/1994 | Burke et al. |
| 5,280,472 A | 1/1994 | Gilhousen et al. |
| 5,297,225 A | 3/1994 | Snow et al. |
| 5,299,947 A | 4/1994 | Barnard |
| 5,301,056 A | 4/1994 | O'Neill |
| 5,325,223 A | 6/1994 | Bears |
| 5,339,058 A | 8/1994 | Lique |
| 5,339,184 A | 8/1994 | Tang |
| 5,343,320 A | 8/1994 | Anderson |
| 5,377,035 A | 12/1994 | Wang et al. |
| 5,379,455 A | 1/1995 | Koschek |
| 5,381,459 A | 1/1995 | Lappington |
| 5,396,224 A | 3/1995 | Dukes et al. |
| 5,400,391 A | 3/1995 | Emura et al. |
| 5,420,863 A | 5/1995 | Taketsugu et al. |
| 5,424,864 A | 6/1995 | Emura |
| 5,444,564 A | 8/1995 | Newberg |
| 5,457,557 A | 10/1995 | Zarem et al. |
| 5,459,727 A | 10/1995 | Vannucci |
| 5,469,523 A | 11/1995 | Blew et al. |
| 5,519,830 A | 5/1996 | Opoczynski |
| 5,543,000 A | 8/1996 | Lique |
| 5,546,443 A | 8/1996 | Raith |
| 5,557,698 A | 9/1996 | Gareis et al. |
| 5,574,815 A | 11/1996 | Kneeland |
| 5,598,288 A | 1/1997 | Collar |
| 5,606,725 A | 2/1997 | Hart |
| 5,615,034 A | 3/1997 | Hori |
| 5,627,879 A | 5/1997 | Russell et al. |
| 5,640,678 A | 6/1997 | Ishikawa et al. |
| 5,642,405 A | 6/1997 | Fischer et al. |
| 5,644,622 A | 7/1997 | Russell et al. |
| 5,648,961 A | 7/1997 | Ebihara |
| 5,651,081 A | 7/1997 | Blew et al. |
| 5,657,374 A | 8/1997 | Russell et al. |
| 5,668,562 A | 9/1997 | Cutrer et al. |
| 5,677,974 A | 10/1997 | Elms et al. |
| 5,682,256 A | 10/1997 | Motley et al. |
| 5,694,232 A | 12/1997 | Parsay et al. |
| 5,703,602 A | 12/1997 | Casebolt |
| 5,708,681 A | 1/1998 | Malkemes et al. |
| 5,726,984 A | 3/1998 | Kubler et al. |
| 5,765,099 A | 6/1998 | Georges et al. |
| 5,790,536 A | 8/1998 | Mahany et al. |
| 5,790,606 A | 8/1998 | Dent |
| 5,793,772 A | 8/1998 | Burke et al. |
| 5,802,173 A | 9/1998 | Hamilton-Piercy et al. |
| 5,802,473 A | 9/1998 | Rutledge et al. |
| 5,805,975 A | 9/1998 | Green, Sr. et al. |
| 5,805,983 A | 9/1998 | Naidu et al. |
| 5,809,395 A | 9/1998 | Hamilton-Piercy et al. |
| 5,809,431 A | 9/1998 | Bustamante et al. |
| 5,812,296 A | 9/1998 | Tarusawa et al. |
| 5,818,619 A | 10/1998 | Medved et al. |
| 5,818,883 A | 10/1998 | Smith et al. |
| 5,821,510 A | 10/1998 | Cohen et al. |
| 5,825,651 A | 10/1998 | Gupta et al. |
| 5,838,474 A | 11/1998 | Stilling |
| 5,839,052 A | 11/1998 | Dean et al. |
| 5,852,651 A | 12/1998 | Fischer et al. |
| 5,854,986 A | 12/1998 | Dorren et al. |
| 5,859,719 A | 1/1999 | Dentai et al. |
| 5,862,460 A | 1/1999 | Rich |
| 5,867,485 A | 2/1999 | Chambers et al. |
| 5,867,763 A | 2/1999 | Dean et al. |
| 5,875,211 A | 2/1999 | Cooper |
| 5,881,200 A | 3/1999 | Burt |
| 5,883,882 A | 3/1999 | Schwartz |
| 5,896,568 A | 4/1999 | Tseng et al. |
| 5,903,834 A | 5/1999 | Wallstedt et al. |
| 5,910,776 A | 6/1999 | Black |
| 5,913,003 A | 6/1999 | Arroyo et al. |
| 5,917,636 A | 6/1999 | Wake et al. |
| 5,930,682 A | 7/1999 | Schwartz et al. |
| 5,936,754 A | 8/1999 | Ariyavisitakul et al. |
| 5,943,372 A | 8/1999 | Gans et al. |
| 5,946,622 A | 8/1999 | Bojeryd |
| 5,949,564 A | 9/1999 | Wake |
| 5,953,670 A | 9/1999 | Newson |
| 5,959,531 A | 9/1999 | Gallagher, III et al. |
| 5,960,344 A | 9/1999 | Mahany |
| 5,969,837 A | 10/1999 | Farber et al. |
| 5,983,070 A | 11/1999 | Georges et al. |
| 5,987,303 A | 11/1999 | Dutta et al. |
| 6,005,884 A | 12/1999 | Cook et al. |
| 6,006,069 A | 12/1999 | Langston et al. |
| 6,006,105 A | 12/1999 | Rostoker et al. |
| 6,011,980 A | 1/2000 | Nagano et al. |
| 6,014,546 A | 1/2000 | Georges et al. |
| 6,016,426 A | 1/2000 | Bodell |
| 6,023,625 A | 2/2000 | Myers, Jr. |
| 6,037,898 A | 3/2000 | Parish et al. |
| 6,061,161 A | 5/2000 | Yang et al. |
| 6,069,721 A | 5/2000 | Oh et al. |
| 6,088,381 A | 7/2000 | Myers, Jr. |
| 6,118,767 A | 9/2000 | Shen et al. |
| 6,122,529 A | 9/2000 | Sabat, Jr. et al. |
| 6,127,917 A | 10/2000 | Tuttle |
| 6,128,470 A | 10/2000 | Naidu et al. |
| 6,128,477 A | 10/2000 | Freed |
| 6,148,041 A | 11/2000 | Dent |
| 6,150,921 A | 11/2000 | Werb et al. |
| 6,157,810 A | 12/2000 | Georges et al. |
| 6,192,216 B1 | 2/2001 | Sabat, Jr. et al. |
| 6,194,968 B1 | 2/2001 | Winslow |
| 6,212,397 B1 | 4/2001 | Langston et al. |
| 6,222,503 B1 | 4/2001 | Gietema |
| 6,223,201 B1 | 4/2001 | Reznak |
| 6,232,870 B1 | 5/2001 | Garber et al. |
| 6,236,789 B1 | 5/2001 | Fitz |
| 6,236,863 B1 | 5/2001 | Waldroup et al. |

(56) References Cited

U.S. PATENT DOCUMENTS

| | | |
|---|---|---|
| 6,240,274 B1 | 5/2001 | Izadpanah |
| 6,246,500 B1 | 6/2001 | Ackerman |
| 6,268,946 B1 | 7/2001 | Larkin et al. |
| 6,275,990 B1 | 8/2001 | Dapper et al. |
| 6,279,158 B1 | 8/2001 | Geile et al. |
| 6,286,163 B1 | 9/2001 | Trimble |
| 6,292,673 B1 | 9/2001 | Maeda et al. |
| 6,295,451 B1 | 9/2001 | Mimura |
| 6,301,240 B1 | 10/2001 | Slabinski et al. |
| 6,307,869 B1 | 10/2001 | Pawelski |
| 6,314,163 B1 | 11/2001 | Acampora |
| 6,317,599 B1 | 11/2001 | Rappaport et al. |
| 6,323,980 B1 | 11/2001 | Bloom |
| 6,324,391 B1 | 11/2001 | Bodell |
| 6,330,241 B1 | 12/2001 | Fort |
| 6,330,244 B1 | 12/2001 | Swartz et al. |
| 6,334,219 B1 | 12/2001 | Hill et al. |
| 6,336,021 B1 | 1/2002 | Nukada |
| 6,336,042 B1 | 1/2002 | Dawson et al. |
| 6,337,754 B1 | 1/2002 | Imajo |
| 6,340,932 B1 | 1/2002 | Rodgers et al. |
| 6,353,406 B1 | 3/2002 | Lanzl et al. |
| 6,353,600 B1 | 3/2002 | Schwartz et al. |
| 6,359,714 B1 | 3/2002 | Imajo |
| 6,370,203 B1 | 4/2002 | Boesch et al. |
| 6,374,078 B1 | 4/2002 | Williams et al. |
| 6,374,124 B1 | 4/2002 | Slabinski |
| 6,389,010 B1 | 5/2002 | Kubler et al. |
| 6,400,318 B1 | 6/2002 | Kasami et al. |
| 6,400,418 B1 | 6/2002 | Wakabayashi |
| 6,404,775 B1 | 6/2002 | Leslie et al. |
| 6,405,018 B1 | 6/2002 | Reudink et al. |
| 6,405,058 B2 | 6/2002 | Bobier |
| 6,405,308 B1 | 6/2002 | Gupta et al. |
| 6,414,624 B2 | 7/2002 | Endo et al. |
| 6,415,132 B1 | 7/2002 | Sabat, Jr. |
| 6,421,327 B1 | 7/2002 | Lundby et al. |
| 6,438,301 B1 | 8/2002 | Johnson et al. |
| 6,438,371 B1 | 8/2002 | Fujise et al. |
| 6,448,558 B1 | 9/2002 | Greene |
| 6,452,915 B1 | 9/2002 | Jorgensen |
| 6,459,519 B1 | 10/2002 | Sasai et al. |
| 6,459,989 B1 | 10/2002 | Kirkpatrick et al. |
| 6,477,154 B1 | 11/2002 | Cheong et al. |
| 6,480,702 B1 | 11/2002 | Sabat, Jr. |
| 6,486,907 B1 | 11/2002 | Farber et al. |
| 6,496,290 B1 | 12/2002 | Lee |
| 6,501,965 B1 | 12/2002 | Lucidarme |
| 6,504,636 B1 | 1/2003 | Seto et al. |
| 6,504,831 B1 | 1/2003 | Greenwood et al. |
| 6,512,478 B1 | 1/2003 | Chien |
| 6,519,395 B1 | 2/2003 | Bevan et al. |
| 6,519,449 B1 | 2/2003 | Zhang et al. |
| 6,525,855 B1 | 2/2003 | Westbrook et al. |
| 6,535,330 B1 | 3/2003 | Lelic et al. |
| 6,535,720 B1 | 3/2003 | Kintis et al. |
| 6,556,551 B1 | 4/2003 | Schwartz |
| 6,577,794 B1 | 6/2003 | Currie et al. |
| 6,577,801 B2 | 6/2003 | Broderick et al. |
| 6,580,402 B2 | 6/2003 | Navarro et al. |
| 6,580,905 B1 | 6/2003 | Naidu et al. |
| 6,580,918 B1 | 6/2003 | Leickel et al. |
| 6,583,763 B2 | 6/2003 | Judd |
| 6,587,514 B1 | 7/2003 | Wright et al. |
| 6,594,496 B2 | 7/2003 | Schwartz |
| 6,597,325 B2 | 7/2003 | Judd et al. |
| 6,598,009 B2 | 7/2003 | Yang |
| 6,606,430 B2 | 8/2003 | Bartur et al. |
| 6,615,074 B2 | 9/2003 | Mickle et al. |
| 6,628,732 B1 | 9/2003 | Takaki |
| 6,634,811 B1 | 10/2003 | Gertel et al. |
| 6,636,747 B2 | 10/2003 | Harada et al. |
| 6,640,103 B1 | 10/2003 | Inman et al. |
| 6,643,437 B1 | 11/2003 | Park |
| 6,652,158 B2 | 11/2003 | Bartur et al. |
| 6,654,590 B2 | 11/2003 | Boros et al. |
| 6,654,616 B1 | 11/2003 | Pope, Jr. et al. |
| 6,657,535 B1 | 12/2003 | Magbie et al. |
| 6,658,269 B1 | 12/2003 | Golemon et al. |
| 6,665,308 B1 | 12/2003 | Rakib et al. |
| 6,670,930 B2 | 12/2003 | Navarro |
| 6,674,966 B1 | 1/2004 | Koonen |
| 6,675,294 B1 | 1/2004 | Gupta et al. |
| 6,678,509 B2 | 1/2004 | Skarman et al. |
| 6,687,437 B1 | 2/2004 | Starnes et al. |
| 6,690,328 B2 | 2/2004 | Judd |
| 6,701,137 B1 | 3/2004 | Judd et al. |
| 6,704,298 B1 | 3/2004 | Matsumiya et al. |
| 6,704,545 B1 | 3/2004 | Wala |
| 6,710,366 B1 | 3/2004 | Lee et al. |
| 6,714,800 B2 | 3/2004 | Johnson et al. |
| 6,731,880 B2 | 5/2004 | Westbrook et al. |
| 6,745,013 B1 | 6/2004 | Porter et al. |
| 6,758,558 B2 | 7/2004 | Chiu et al. |
| 6,758,913 B1 | 7/2004 | Tunney et al. |
| 6,763,226 B1 | 7/2004 | McZeal, Jr. |
| 6,771,862 B2 | 8/2004 | Karnik et al. |
| 6,771,933 B1 | 8/2004 | Eng et al. |
| 6,784,802 B1 | 8/2004 | Stanescu |
| 6,785,558 B1 | 8/2004 | Stratford et al. |
| 6,788,666 B1 | 9/2004 | Linebarger et al. |
| 6,801,767 B1 | 10/2004 | Schwartz et al. |
| 6,807,374 B1 | 10/2004 | Imajo et al. |
| 6,812,824 B1 | 11/2004 | Goldinger et al. |
| 6,812,905 B2 | 11/2004 | Thomas et al. |
| 6,823,174 B1 | 11/2004 | Masenten et al. |
| 6,826,163 B2 | 11/2004 | Mani et al. |
| 6,826,164 B2 | 11/2004 | Mani et al. |
| 6,826,337 B2 | 11/2004 | Linnell |
| 6,836,660 B1 | 12/2004 | Wala |
| 6,836,673 B1 | 12/2004 | Troll |
| 6,842,433 B2 | 1/2005 | West et al. |
| 6,847,856 B1 | 1/2005 | Bohannon |
| 6,850,510 B2 | 2/2005 | Kubler |
| 6,865,390 B2 | 3/2005 | Goss et al. |
| 6,871,081 B1 | 3/2005 | Llewellyn et al. |
| 6,873,823 B2 | 3/2005 | Hasarchi |
| 6,876,056 B2 | 4/2005 | Tilmans et al. |
| 6,879,290 B1 | 4/2005 | Toutain et al. |
| 6,882,311 B2 | 4/2005 | Walker et al. |
| 6,883,710 B2 | 4/2005 | Chung |
| 6,885,344 B2 | 4/2005 | Mohamadi |
| 6,885,846 B1 | 4/2005 | Panasik et al. |
| 6,889,060 B2 | 5/2005 | Fernando et al. |
| 6,901,061 B1 | 5/2005 | Joo et al. |
| 6,909,399 B1 | 6/2005 | Zegelin et al. |
| 6,915,058 B2 | 7/2005 | Pons |
| 6,915,529 B1 | 7/2005 | Suematsu et al. |
| 6,919,858 B2 | 7/2005 | Rofougaran |
| 6,920,330 B2 | 7/2005 | Caronni et al. |
| 6,924,997 B2 | 8/2005 | Chen et al. |
| 6,930,987 B1 | 8/2005 | Fukuda et al. |
| 6,931,183 B2 | 8/2005 | Panak et al. |
| 6,931,659 B1 | 8/2005 | Kinemura |
| 6,931,813 B2 | 8/2005 | Collie |
| 6,933,849 B2 | 8/2005 | Sawyer |
| 6,934,511 B1 | 8/2005 | Lovinggood et al. |
| 6,934,541 B2 | 8/2005 | Miyatani |
| 6,939,222 B2 | 9/2005 | Grossjohann et al. |
| 6,941,112 B2 | 9/2005 | Hasegawa |
| 6,946,989 B2 | 9/2005 | Vavik |
| 6,961,312 B2 | 11/2005 | Kubler et al. |
| 6,963,289 B2 | 11/2005 | Aljadeff et al. |
| 6,963,552 B2 | 11/2005 | Sabat, Jr. et al. |
| 6,965,718 B2 | 11/2005 | Koertel |
| 6,967,347 B2 | 11/2005 | Estes et al. |
| 6,968,107 B2 | 11/2005 | Belardi et al. |
| 6,970,652 B2 | 11/2005 | Zhang et al. |
| 6,973,243 B2 | 12/2005 | Koyasu et al. |
| 6,974,262 B1 | 12/2005 | Rickenbach |
| 6,977,502 B1 | 12/2005 | Hertz |
| 7,002,511 B1 | 2/2006 | Ammar et al. |
| 7,006,465 B2 | 2/2006 | Toshimitsu et al. |
| 7,013,087 B2 | 3/2006 | Suzuki et al. |

(56) References Cited

U.S. PATENT DOCUMENTS

| | | |
|---|---|---|
| 7,015,826 B1 | 3/2006 | Chan et al. |
| 7,020,473 B2 | 3/2006 | Splett |
| 7,020,488 B1 | 3/2006 | Bleile et al. |
| 7,024,166 B2 | 4/2006 | Wallace |
| 7,035,512 B2 | 4/2006 | Van Bijsterveld |
| 7,039,399 B2 | 5/2006 | Fischer |
| 7,043,271 B1 | 5/2006 | Seto et al. |
| 7,047,028 B2 | 5/2006 | Cagenius et al. |
| 7,050,017 B2 | 5/2006 | King et al. |
| 7,053,838 B2 | 5/2006 | Judd |
| 7,054,513 B2 | 5/2006 | Herz et al. |
| 7,069,577 B2 | 6/2006 | Geile et al. |
| 7,072,586 B2 | 7/2006 | Aburakawa et al. |
| 7,082,320 B2 | 7/2006 | Kattukaran et al. |
| 7,084,769 B2 | 8/2006 | Bauer et al. |
| 7,093,985 B2 | 8/2006 | Lord et al. |
| 7,103,119 B2 | 9/2006 | Matsuoka et al. |
| 7,103,377 B2 | 9/2006 | Bauman et al. |
| 7,106,252 B2 | 9/2006 | Smith et al. |
| 7,106,931 B2 | 9/2006 | Sutehall et al. |
| 7,110,795 B2 | 9/2006 | Doi |
| 7,114,859 B1 | 10/2006 | Tuohimaa et al. |
| 7,127,175 B2 | 10/2006 | Mani et al. |
| 7,127,176 B2 | 10/2006 | Sasaki |
| 7,142,503 B1 | 11/2006 | Grant et al. |
| 7,142,535 B2 | 11/2006 | Kubler et al. |
| 7,142,619 B2 | 11/2006 | Sommer et al. |
| 7,146,506 B1 | 12/2006 | Hannah et al. |
| 7,160,032 B2 | 1/2007 | Nagashima et al. |
| 7,171,244 B2 | 1/2007 | Bauman |
| 7,184,728 B2 | 2/2007 | Solum |
| 7,190,748 B2 | 3/2007 | Kim et al. |
| 7,194,023 B2 | 3/2007 | Norrell et al. |
| 7,199,443 B2 | 4/2007 | Elsharawy |
| 7,200,305 B2 | 4/2007 | Dion et al. |
| 7,200,391 B2 | 4/2007 | Chung et al. |
| 7,228,072 B2 | 6/2007 | Mickelsson et al. |
| 7,254,330 B2 | 8/2007 | Pratt et al. |
| 7,263,293 B2 | 8/2007 | Ommodt et al. |
| 7,269,311 B2 | 9/2007 | Kim et al. |
| 7,280,011 B2 | 10/2007 | Bayar et al. |
| 7,286,843 B2 | 10/2007 | Scheck |
| 7,286,854 B2 | 10/2007 | Ferrato et al. |
| 7,295,119 B2 | 11/2007 | Rappaport et al. |
| 7,310,430 B1 | 12/2007 | Mallya et al. |
| 7,313,415 B2 | 12/2007 | Wake et al. |
| 7,315,735 B2 | 1/2008 | Graham |
| 7,324,730 B2 | 1/2008 | Varkey et al. |
| 7,343,164 B2 | 3/2008 | Kallstenius |
| 7,348,843 B1 | 3/2008 | Qiu et al. |
| 7,349,633 B2 | 3/2008 | Lee et al. |
| 7,359,408 B2 | 4/2008 | Kim |
| 7,359,674 B2 | 4/2008 | Markki et al. |
| 7,366,150 B2 | 4/2008 | Lee et al. |
| 7,366,151 B2 | 4/2008 | Kubler et al. |
| 7,369,526 B2 | 5/2008 | Lechleider et al. |
| 7,379,669 B2 | 5/2008 | Kim |
| 7,388,892 B2 | 6/2008 | Nishiyama et al. |
| 7,392,025 B2 | 6/2008 | Rooyen et al. |
| 7,392,029 B2 | 6/2008 | Pronkine |
| 7,394,883 B2 | 7/2008 | Funakubo et al. |
| 7,403,156 B2 | 7/2008 | Coppi et al. |
| 7,409,159 B2 | 8/2008 | Izadpanah |
| 7,412,224 B2 | 8/2008 | Kotola et al. |
| 7,424,228 B1 | 9/2008 | Williams et al. |
| 7,444,051 B2 | 10/2008 | Tatat et al. |
| 7,450,853 B2 | 11/2008 | Kim et al. |
| 7,450,854 B2 | 11/2008 | Lee et al. |
| 7,451,365 B2 | 11/2008 | Wang et al. |
| 7,454,222 B2 | 11/2008 | Huang et al. |
| 7,460,507 B2 | 12/2008 | Kubler et al. |
| 7,460,829 B2 | 12/2008 | Utsumi et al. |
| 7,460,831 B2 | 12/2008 | Hasarchi |
| 7,466,925 B2 | 12/2008 | Iannelli |
| 7,469,105 B2 | 12/2008 | Wake et al. |
| 7,477,597 B2 | 1/2009 | Segel |
| 7,483,504 B2 | 1/2009 | Shapira et al. |
| 7,483,711 B2 | 1/2009 | Burchfiel |
| 7,495,560 B2 | 2/2009 | Easton et al. |
| 7,496,070 B2 | 2/2009 | Vesuna |
| 7,496,384 B2 | 2/2009 | Seto et al. |
| 7,505,747 B2 | 3/2009 | Solum |
| 7,512,419 B2 | 3/2009 | Solum |
| 7,522,552 B2 | 4/2009 | Fein et al. |
| 7,539,509 B2 | 5/2009 | Bauman et al. |
| 7,542,452 B2 | 6/2009 | Penumetsa |
| 7,546,138 B2 | 6/2009 | Bauman |
| 7,548,138 B2 | 6/2009 | Kamgaing |
| 7,548,695 B2 | 6/2009 | Wake |
| 7,551,641 B2 | 6/2009 | Pirzada et al. |
| 7,557,758 B2 | 7/2009 | Rofougaran |
| 7,565,080 B2 | 7/2009 | Mickelsson et al. |
| 7,580,384 B2 | 8/2009 | Kubler et al. |
| 7,586,861 B2 | 9/2009 | Kubler et al. |
| 7,590,354 B2 | 9/2009 | Sauer et al. |
| 7,593,704 B2 | 9/2009 | Pinel et al. |
| 7,599,420 B2 | 10/2009 | Forenza et al. |
| 7,599,672 B2 | 10/2009 | Shoji et al. |
| 7,610,046 B2 | 10/2009 | Wala |
| 7,627,250 B2 | 12/2009 | George et al. |
| 7,630,690 B2 | 12/2009 | Kaewell, Jr. et al. |
| 7,633,934 B2 | 12/2009 | Kubler et al. |
| 7,639,982 B2 | 12/2009 | Wala |
| 7,646,743 B2 | 1/2010 | Kubler et al. |
| 7,646,777 B2 | 1/2010 | Hicks, III et al. |
| 7,653,397 B2 | 1/2010 | Pernu et al. |
| 7,668,565 B2 | 2/2010 | Ylänen et al. |
| 7,672,591 B2 | 3/2010 | Soto et al. |
| 7,675,936 B2 | 3/2010 | Mizutani et al. |
| 7,688,811 B2 | 3/2010 | Kubler et al. |
| 7,693,486 B2 | 4/2010 | Kasslin et al. |
| 7,697,467 B2 | 4/2010 | Kubler et al. |
| 7,697,574 B2 | 4/2010 | Suematsu et al. |
| 7,715,375 B2 | 5/2010 | Kubler et al. |
| 7,720,510 B2 | 5/2010 | Pescod et al. |
| 7,751,374 B2 | 7/2010 | Donovan |
| 7,751,838 B2 | 7/2010 | Ramesh et al. |
| 7,760,703 B2 | 7/2010 | Kubler et al. |
| 7,761,093 B2 | 7/2010 | Sabat, Jr. et al. |
| 7,768,951 B2 | 8/2010 | Kubler et al. |
| 7,773,573 B2 | 8/2010 | Chung et al. |
| 7,778,603 B2 | 8/2010 | Palin et al. |
| 7,787,823 B2 | 8/2010 | George et al. |
| 7,805,073 B2 | 9/2010 | Sabat, Jr. et al. |
| 7,809,012 B2 | 10/2010 | Ruuska et al. |
| 7,812,766 B2 | 10/2010 | Leblanc et al. |
| 7,812,775 B2 | 10/2010 | Babakhani et al. |
| 7,817,969 B2 | 10/2010 | Castaneda et al. |
| 7,835,328 B2 | 11/2010 | Stephens et al. |
| 7,848,316 B2 | 12/2010 | Kubler et al. |
| 7,848,770 B2 | 12/2010 | Scheinert |
| 7,853,234 B2 | 12/2010 | Afsahi |
| 7,870,321 B2 | 1/2011 | Rofougaran |
| 7,880,677 B2 | 2/2011 | Rofougaran et al. |
| 7,881,755 B1 | 2/2011 | Mishra et al. |
| 7,894,423 B2 | 2/2011 | Kubler et al. |
| 7,899,007 B2 | 3/2011 | Kubler et al. |
| 7,907,972 B2 | 3/2011 | Walton et al. |
| 7,912,043 B2 | 3/2011 | Kubler et al. |
| 7,912,506 B2 | 3/2011 | Lovberg et al. |
| 7,916,706 B2 | 3/2011 | Kubler et al. |
| 7,917,177 B2 | 3/2011 | Bauman |
| 7,920,553 B2 | 4/2011 | Kubler et al. |
| 7,920,858 B2 | 4/2011 | Sabat, Jr. et al. |
| 7,924,783 B1 | 4/2011 | Mahany et al. |
| 7,936,713 B2 | 5/2011 | Kubler et al. |
| 7,949,364 B2 | 5/2011 | Kasslin et al. |
| 7,957,777 B1 | 6/2011 | Vu et al. |
| 7,962,111 B2 | 6/2011 | Solum |
| 7,969,009 B2 | 6/2011 | Chandrasekaran |
| 7,969,911 B2 | 6/2011 | Mahany et al. |
| 7,990,925 B2 | 8/2011 | Tinnakornsrisuphap et al. |
| 7,996,020 B1 | 8/2011 | Chhabra |
| 8,018,907 B2 | 9/2011 | Kubler et al. |

(56) References Cited

U.S. PATENT DOCUMENTS

| | | |
|---|---|---|
| 8,023,886 B2 | 9/2011 | Rofougaran |
| 8,027,656 B2 | 9/2011 | Rofougaran et al. |
| 8,036,308 B2 | 10/2011 | Rofougaran |
| 8,073,329 B2 | 12/2011 | Gao et al. |
| 8,082,353 B2 | 12/2011 | Huber et al. |
| 8,086,192 B2 | 12/2011 | Rofougaran et al. |
| 8,107,815 B2 | 1/2012 | Akasaka et al. |
| 8,135,102 B2 | 3/2012 | Wiwel et al. |
| 8,155,525 B2 | 4/2012 | Cox |
| 8,213,401 B2 | 7/2012 | Fischer et al. |
| 8,223,795 B2 | 7/2012 | Cox et al. |
| 8,228,849 B2 | 7/2012 | Trachewsky |
| 8,238,463 B1 | 8/2012 | Arslan et al. |
| 8,270,387 B2 | 9/2012 | Cannon et al. |
| 8,275,262 B2 | 9/2012 | Cui et al. |
| 8,280,250 B2 | 10/2012 | Brodsky et al. |
| 8,280,259 B2 | 10/2012 | George et al. |
| 8,290,483 B2 | 10/2012 | Sabat, Jr. et al. |
| 8,306,563 B2 | 11/2012 | Zavadsky et al. |
| 8,346,278 B2 | 1/2013 | Wala et al. |
| 8,351,792 B2 | 1/2013 | Zheng |
| 8,374,508 B2 | 2/2013 | Soto et al. |
| 8,391,256 B2 | 3/2013 | Beach |
| 8,422,883 B2 | 4/2013 | Yeh et al. |
| 8,428,510 B2 | 4/2013 | Stratford et al. |
| 8,452,178 B2 | 5/2013 | Gao et al. |
| 8,462,683 B2 | 6/2013 | Uyehara et al. |
| 8,472,409 B2 | 6/2013 | Sun et al. |
| 8,472,579 B2 | 6/2013 | Uyehara et al. |
| 8,488,966 B2 | 7/2013 | Zheng |
| 8,509,215 B2 | 8/2013 | Stuart |
| 8,509,850 B2 | 8/2013 | Zavadsky et al. |
| 8,526,970 B2 | 9/2013 | Wala et al. |
| 8,532,242 B2 | 9/2013 | Fischer et al. |
| 8,548,330 B2 | 10/2013 | Berlin et al. |
| 8,626,245 B2 | 1/2014 | Zavadsky et al. |
| 8,639,121 B2 | 1/2014 | George et al. |
| 8,649,684 B2 | 2/2014 | Casterline et al. |
| 8,676,214 B2 | 3/2014 | Fischer et al. |
| 8,737,454 B2 | 5/2014 | Wala et al. |
| 8,743,718 B2 | 6/2014 | Grenier et al. |
| 8,743,756 B2 | 6/2014 | Uyehara et al. |
| 8,780,743 B2 | 7/2014 | Sombrutzki et al. |
| 8,792,933 B2 | 7/2014 | Chen |
| 8,831,428 B2 | 9/2014 | Kobyakov et al. |
| 8,837,659 B2 | 9/2014 | Uyehara et al. |
| 8,837,940 B2 | 9/2014 | Smith et al. |
| 8,873,585 B2 | 10/2014 | Oren et al. |
| 8,929,288 B2 | 1/2015 | Stewart et al. |
| 9,107,086 B2 | 8/2015 | Leimeister et al. |
| 9,112,547 B2 | 8/2015 | Scheinert et al. |
| 9,240,835 B2 | 1/2016 | Berlin et al. |
| 9,306,682 B2 | 4/2016 | Singh |
| 9,485,022 B2 | 11/2016 | George et al. |
| 9,525,488 B2 | 12/2016 | Beamon et al. |
| 9,673,904 B2 | 6/2017 | Palanisamy et al. |
| 9,681,313 B2 | 6/2017 | Malach |
| 2001/0036163 A1 | 11/2001 | Sabat, Jr. et al. |
| 2001/0036199 A1 | 11/2001 | Terry |
| 2002/0003645 A1 | 1/2002 | Kim et al. |
| 2002/0009070 A1 | 1/2002 | Lindsay et al. |
| 2002/0012336 A1 | 1/2002 | Hughes et al. |
| 2002/0012495 A1 | 1/2002 | Sasai et al. |
| 2002/0016827 A1 | 2/2002 | McCabe et al. |
| 2002/0045518 A1 | 4/2002 | Dalebout et al. |
| 2002/0045519 A1 | 4/2002 | Watterson et al. |
| 2002/0048071 A1 | 4/2002 | Suzuki et al. |
| 2002/0051434 A1 | 5/2002 | Ozluturk et al. |
| 2002/0061763 A1 | 5/2002 | Weissman |
| 2002/0075906 A1 | 6/2002 | Cole et al. |
| 2002/0092347 A1 | 7/2002 | Niekerk et al. |
| 2002/0097564 A1 | 7/2002 | Struhsaker et al. |
| 2002/0103012 A1 | 8/2002 | Kim et al. |
| 2002/0111149 A1 | 8/2002 | Shoki |
| 2002/0111192 A1 | 8/2002 | Thomas et al. |
| 2002/0114038 A1 | 8/2002 | Arnon et al. |
| 2002/0123365 A1 | 9/2002 | Thorson et al. |
| 2002/0126967 A1 | 9/2002 | Panak et al. |
| 2002/0128009 A1 | 9/2002 | Boch et al. |
| 2002/0130778 A1 | 9/2002 | Nicholson |
| 2002/0139064 A1 | 10/2002 | Norwood |
| 2002/0181668 A1 | 12/2002 | Masoian et al. |
| 2002/0190845 A1 | 12/2002 | Moore |
| 2002/0197984 A1 | 12/2002 | Monin et al. |
| 2003/0002604 A1 | 1/2003 | Fifield et al. |
| 2003/0007214 A1 | 1/2003 | Aburakawa et al. |
| 2003/0016418 A1 | 1/2003 | Westbrook et al. |
| 2003/0045284 A1 | 3/2003 | Copley et al. |
| 2003/0069922 A1 | 4/2003 | Arunachalam |
| 2003/0078074 A1 | 4/2003 | Sesay et al. |
| 2003/0112826 A1 | 6/2003 | Ashwood Smith et al. |
| 2003/0126294 A1 | 7/2003 | Thorsteinson et al. |
| 2003/0141962 A1 | 7/2003 | Barink |
| 2003/0161637 A1 | 8/2003 | Yamamoto et al. |
| 2003/0165287 A1 | 9/2003 | Krill et al. |
| 2003/0172257 A1 | 9/2003 | Greenblat et al. |
| 2003/0174099 A1 | 9/2003 | Bauer et al. |
| 2003/0209601 A1 | 11/2003 | Chung |
| 2004/0001719 A1 | 1/2004 | Sasaki |
| 2004/0008114 A1 | 1/2004 | Sawyer |
| 2004/0017785 A1 | 1/2004 | Zelst |
| 2004/0037565 A1 | 2/2004 | Young et al. |
| 2004/0041714 A1 | 3/2004 | Forster |
| 2004/0043764 A1 | 3/2004 | Bigham et al. |
| 2004/0047313 A1 | 3/2004 | Rumpf et al. |
| 2004/0078151 A1 | 4/2004 | Aljadeff et al. |
| 2004/0095907 A1 | 5/2004 | Agee et al. |
| 2004/0100930 A1 | 5/2004 | Shapira et al. |
| 2004/0106435 A1 | 6/2004 | Bauman et al. |
| 2004/0126068 A1 | 7/2004 | Van Bijsterveld |
| 2004/0126107 A1 | 7/2004 | Jay et al. |
| 2004/0139477 A1 | 7/2004 | Russell et al. |
| 2004/0146020 A1 | 7/2004 | Kubler et al. |
| 2004/0149736 A1 | 8/2004 | Clothier |
| 2004/0151164 A1 | 8/2004 | Kubler et al. |
| 2004/0151503 A1 | 8/2004 | Kashima et al. |
| 2004/0157623 A1 | 8/2004 | Splett |
| 2004/0160912 A1 | 8/2004 | Kubler et al. |
| 2004/0160913 A1 | 8/2004 | Kubler et al. |
| 2004/0162084 A1 | 8/2004 | Wang |
| 2004/0162115 A1 | 8/2004 | Smith et al. |
| 2004/0162116 A1 | 8/2004 | Han et al. |
| 2004/0165573 A1 | 8/2004 | Kubler et al. |
| 2004/0175173 A1 | 9/2004 | Deas |
| 2004/0196404 A1 | 10/2004 | Loheit et al. |
| 2004/0202257 A1 | 10/2004 | Mehta et al. |
| 2004/0203703 A1 | 10/2004 | Fischer |
| 2004/0203704 A1 | 10/2004 | Ommodt et al. |
| 2004/0203846 A1 | 10/2004 | Caronni et al. |
| 2004/0204109 A1 | 10/2004 | Hoppenstein |
| 2004/0208526 A1 | 10/2004 | Mibu |
| 2004/0208643 A1 | 10/2004 | Roberts et al. |
| 2004/0215723 A1 | 10/2004 | Chadha |
| 2004/0218873 A1 | 11/2004 | Nagashima et al. |
| 2004/0233877 A1 | 11/2004 | Lee et al. |
| 2004/0240884 A1 | 12/2004 | Gumaste et al. |
| 2004/0258105 A1 | 12/2004 | Spathas et al. |
| 2004/0267971 A1 | 12/2004 | Seshadri |
| 2005/0013612 A1 | 1/2005 | Yap |
| 2005/0052287 A1 | 3/2005 | Whitesmith et al. |
| 2005/0058451 A1 | 3/2005 | Ross |
| 2005/0058455 A1 | 3/2005 | Aronson et al. |
| 2005/0068179 A1 | 3/2005 | Roesner |
| 2005/0076982 A1 | 4/2005 | Metcalf et al. |
| 2005/0078006 A1 | 4/2005 | Hutchins |
| 2005/0093679 A1 | 5/2005 | Zai et al. |
| 2005/0099343 A1 | 5/2005 | Asrani et al. |
| 2005/0116821 A1 | 6/2005 | Wilsey et al. |
| 2005/0123232 A1 | 6/2005 | Piede et al. |
| 2005/0141545 A1 | 6/2005 | Fein et al. |
| 2005/0143077 A1 | 6/2005 | Charbonneau |
| 2005/0147067 A1 | 7/2005 | Mani et al. |
| 2005/0147071 A1 | 7/2005 | Karaoguz et al. |
| 2005/0148306 A1 | 7/2005 | Hiddink |

(56) References Cited

U.S. PATENT DOCUMENTS

| | | |
|---|---|---|
| 2005/0159108 A1 | 7/2005 | Fletcher |
| 2005/0174236 A1 | 8/2005 | Brookner |
| 2005/0176458 A1 | 8/2005 | Shklarsky et al. |
| 2005/0201323 A1 | 9/2005 | Mani et al. |
| 2005/0201761 A1 | 9/2005 | Bartur et al. |
| 2005/0219050 A1 | 10/2005 | Martin |
| 2005/0224585 A1 | 10/2005 | Durrant et al. |
| 2005/0226625 A1 | 10/2005 | Wake et al. |
| 2005/0232636 A1 | 10/2005 | Durrant et al. |
| 2005/0242188 A1 | 11/2005 | Vesuna |
| 2005/0252971 A1 | 11/2005 | Howarth et al. |
| 2005/0266797 A1 | 12/2005 | Utsumi et al. |
| 2005/0266854 A1 | 12/2005 | Niiho et al. |
| 2005/0269930 A1 | 12/2005 | Shimizu et al. |
| 2005/0271396 A1 | 12/2005 | Iannelli |
| 2005/0272439 A1 | 12/2005 | Picciriello et al. |
| 2006/0002326 A1 | 1/2006 | Vesuna |
| 2006/0014548 A1 | 1/2006 | Bolin |
| 2006/0017633 A1 | 1/2006 | Pronkine |
| 2006/0028352 A1 | 2/2006 | McNamara et al. |
| 2006/0045054 A1 | 3/2006 | Utsumi et al. |
| 2006/0045524 A1 | 3/2006 | Lee et al. |
| 2006/0045525 A1 | 3/2006 | Lee et al. |
| 2006/0053324 A1 | 3/2006 | Giat et al. |
| 2006/0056327 A1 | 3/2006 | Coersmeier |
| 2006/0062579 A1 | 3/2006 | Kim et al. |
| 2006/0083512 A1 | 4/2006 | Wake |
| 2006/0083520 A1 | 4/2006 | Healey et al. |
| 2006/0094470 A1 | 5/2006 | Wake et al. |
| 2006/0104643 A1 | 5/2006 | Lee et al. |
| 2006/0146755 A1 | 7/2006 | Pan et al. |
| 2006/0159388 A1 | 7/2006 | Kawase et al. |
| 2006/0172775 A1 | 8/2006 | Conyers et al. |
| 2006/0182446 A1 | 8/2006 | Kim et al. |
| 2006/0182449 A1 | 8/2006 | Iannelli et al. |
| 2006/0189354 A1 | 8/2006 | Lee et al. |
| 2006/0209745 A1 | 9/2006 | MacMullan et al. |
| 2006/0223439 A1 | 10/2006 | Pinel et al. |
| 2006/0233506 A1 | 10/2006 | Noonan et al. |
| 2006/0239630 A1 | 10/2006 | Hase et al. |
| 2006/0268738 A1 | 11/2006 | Goerke et al. |
| 2006/0274704 A1 | 12/2006 | Desai et al. |
| 2007/0009266 A1 | 1/2007 | Bothwell |
| 2007/0050451 A1 | 3/2007 | Caspi et al. |
| 2007/0054682 A1 | 3/2007 | Fanning et al. |
| 2007/0058978 A1 | 3/2007 | Lee et al. |
| 2007/0060045 A1 | 3/2007 | Prautzsch |
| 2007/0060055 A1 | 3/2007 | Desai et al. |
| 2007/0071128 A1 | 3/2007 | Meir et al. |
| 2007/0076649 A1 | 4/2007 | Lin et al. |
| 2007/0093273 A1 | 4/2007 | Cai |
| 2007/0149250 A1 | 6/2007 | Crozzoli et al. |
| 2007/0166042 A1 | 7/2007 | Seeds et al. |
| 2007/0173288 A1 | 7/2007 | Skarby et al. |
| 2007/0174889 A1 | 7/2007 | Kim et al. |
| 2007/0224954 A1 | 9/2007 | Gopi |
| 2007/0230328 A1 | 10/2007 | Saitou |
| 2007/0243899 A1 | 10/2007 | Hermel et al. |
| 2007/0248358 A1 | 10/2007 | Sauer |
| 2007/0253714 A1 | 11/2007 | Seeds et al. |
| 2007/0257796 A1 | 11/2007 | Easton et al. |
| 2007/0264009 A1 | 11/2007 | Sabat, Jr. et al. |
| 2007/0264011 A1 | 11/2007 | Sone et al. |
| 2007/0268846 A1 | 11/2007 | Proctor et al. |
| 2007/0274279 A1 | 11/2007 | Wood et al. |
| 2007/0280370 A1 | 12/2007 | Liu |
| 2007/0286599 A1 | 12/2007 | Sauer et al. |
| 2007/0292143 A1 | 12/2007 | Yu et al. |
| 2007/0297005 A1 | 12/2007 | Montierth et al. |
| 2008/0002652 A1 | 1/2008 | Gupta et al. |
| 2008/0007453 A1 | 1/2008 | Vassilakis et al. |
| 2008/0013909 A1 | 1/2008 | Kostet et al. |
| 2008/0013956 A1 | 1/2008 | Ware et al. |
| 2008/0013957 A1 | 1/2008 | Akers et al. |
| 2008/0014948 A1 | 1/2008 | Scheinert |
| 2008/0014992 A1 | 1/2008 | Pescod et al. |
| 2008/0026765 A1 | 1/2008 | Charbonneau |
| 2008/0031628 A1 | 2/2008 | Dragas et al. |
| 2008/0043714 A1 | 2/2008 | Pernu |
| 2008/0056167 A1 | 3/2008 | Kim et al. |
| 2008/0058018 A1 | 3/2008 | Scheinert |
| 2008/0063397 A1 | 3/2008 | Hu et al. |
| 2008/0070502 A1 | 3/2008 | George et al. |
| 2008/0080863 A1 | 4/2008 | Sauer et al. |
| 2008/0098203 A1 | 4/2008 | Master et al. |
| 2008/0118014 A1 | 5/2008 | Reunamaki et al. |
| 2008/0119198 A1 | 5/2008 | Hettstedt et al. |
| 2008/0124086 A1 | 5/2008 | Matthews |
| 2008/0124087 A1 | 5/2008 | Hartmann et al. |
| 2008/0129634 A1 | 6/2008 | Pera et al. |
| 2008/0134194 A1 | 6/2008 | Liu |
| 2008/0145061 A1 | 6/2008 | Lee et al. |
| 2008/0150514 A1 | 6/2008 | Codreanu et al. |
| 2008/0159744 A1 | 7/2008 | Soto et al. |
| 2008/0166094 A1 | 7/2008 | Bookbinder et al. |
| 2008/0191682 A1 | 8/2008 | Cook |
| 2008/0194226 A1 | 8/2008 | Rivas et al. |
| 2008/0207253 A1 | 8/2008 | Jaakkola et al. |
| 2008/0212969 A1 | 9/2008 | Fasshauer et al. |
| 2008/0219670 A1 | 9/2008 | Kim et al. |
| 2008/0232305 A1 | 9/2008 | Oren et al. |
| 2008/0232799 A1 | 9/2008 | Kim |
| 2008/0247716 A1 | 10/2008 | Thomas |
| 2008/0253280 A1 | 10/2008 | Tang et al. |
| 2008/0253351 A1 | 10/2008 | Pernu et al. |
| 2008/0253773 A1 | 10/2008 | Zheng |
| 2008/0260388 A1 | 10/2008 | Kim et al. |
| 2008/0260389 A1 | 10/2008 | Zheng |
| 2008/0261656 A1 | 10/2008 | Bella et al. |
| 2008/0268766 A1 | 10/2008 | Narkmon et al. |
| 2008/0268833 A1 | 10/2008 | Huang et al. |
| 2008/0273844 A1 | 11/2008 | Kewitsch |
| 2008/0279137 A1 | 11/2008 | Pernu et al. |
| 2008/0280569 A1 | 11/2008 | Hazani et al. |
| 2008/0291830 A1 | 11/2008 | Pernu et al. |
| 2008/0292322 A1 | 11/2008 | Daghighian et al. |
| 2008/0298813 A1 | 12/2008 | Song et al. |
| 2008/0304831 A1 | 12/2008 | Miller, II et al. |
| 2008/0310464 A1 | 12/2008 | Schneider |
| 2008/0310848 A1 | 12/2008 | Yasuda et al. |
| 2008/0311876 A1 | 12/2008 | Leenaerts et al. |
| 2008/0311944 A1 | 12/2008 | Hansen et al. |
| 2009/0022304 A1 | 1/2009 | Kubler et al. |
| 2009/0028087 A1 | 1/2009 | Nguyen et al. |
| 2009/0028317 A1 | 1/2009 | Ling et al. |
| 2009/0041413 A1 | 2/2009 | Hurley |
| 2009/0047023 A1 | 2/2009 | Pescod et al. |
| 2009/0059903 A1 | 3/2009 | Kubler et al. |
| 2009/0061796 A1 | 3/2009 | Arkko et al. |
| 2009/0061939 A1 | 3/2009 | Andersson et al. |
| 2009/0067363 A1 | 3/2009 | Ruiz et al. |
| 2009/0073916 A1 | 3/2009 | Zhang et al. |
| 2009/0081985 A1 | 3/2009 | Rofougaran et al. |
| 2009/0087179 A1 | 4/2009 | Underwood et al. |
| 2009/0088071 A1 | 4/2009 | Rofougaran |
| 2009/0088072 A1 | 4/2009 | Rofougaran et al. |
| 2009/0097855 A1* | 4/2009 | Thelen ............ H04B 10/25752 398/115 |
| 2009/0135078 A1 | 5/2009 | Lindmark et al. |
| 2009/0141780 A1 | 6/2009 | Cruz-Albrecht et al. |
| 2009/0149221 A1 | 6/2009 | Liu et al. |
| 2009/0154621 A1 | 6/2009 | Shapira et al. |
| 2009/0169163 A1 | 7/2009 | Abbott, III et al. |
| 2009/0175214 A1 | 7/2009 | Sfar et al. |
| 2009/0180407 A1 | 7/2009 | Sabat et al. |
| 2009/0180426 A1 | 7/2009 | Sabat et al. |
| 2009/0218407 A1 | 9/2009 | Rofougaran |
| 2009/0218657 A1 | 9/2009 | Rofougaran |
| 2009/0237317 A1 | 9/2009 | Rofougaran |
| 2009/0245084 A1 | 10/2009 | Moffatt et al. |
| 2009/0245153 A1 | 10/2009 | Li et al. |
| 2009/0245221 A1 | 10/2009 | Piipponen |
| 2009/0247109 A1 | 10/2009 | Rofougaran |
| 2009/0252136 A1 | 10/2009 | Mahany et al. |

(56) References Cited

U.S. PATENT DOCUMENTS

| | | |
|---|---|---|
| 2009/0252139 A1 | 10/2009 | Ludovico et al. |
| 2009/0252205 A1 | 10/2009 | Rheinfelder et al. |
| 2009/0258652 A1 | 10/2009 | Lambert et al. |
| 2009/0278596 A1 | 11/2009 | Rofougaran et al. |
| 2009/0279593 A1 | 11/2009 | Rofougaran et al. |
| 2009/0285147 A1 | 11/2009 | Subasic et al. |
| 2009/0316608 A1 | 12/2009 | Singh et al. |
| 2009/0316609 A1 | 12/2009 | Singh |
| 2009/0316611 A1 | 12/2009 | Stratford et al. |
| 2009/0319909 A1 | 12/2009 | Hsueh et al. |
| 2010/0002626 A1 | 1/2010 | Schmidt et al. |
| 2010/0002661 A1 | 1/2010 | Schmidt et al. |
| 2010/0002662 A1 | 1/2010 | Schmidt et al. |
| 2010/0014494 A1 | 1/2010 | Schmidt et al. |
| 2010/0014868 A1 | 1/2010 | McGlynn et al. |
| 2010/0027443 A1 | 2/2010 | LoGalbo et al. |
| 2010/0054746 A1 | 3/2010 | Logan |
| 2010/0056200 A1 | 3/2010 | Tolonen |
| 2010/0080154 A1 | 4/2010 | Noh et al. |
| 2010/0080182 A1 | 4/2010 | Kubler et al. |
| 2010/0091475 A1 | 4/2010 | Toms et al. |
| 2010/0093391 A1 | 4/2010 | Saban et al. |
| 2010/0099451 A1 | 4/2010 | Saban et al. |
| 2010/0118864 A1 | 5/2010 | Kubler et al. |
| 2010/0127937 A1 | 5/2010 | Chandrasekaran et al. |
| 2010/0134257 A1 | 6/2010 | Puleston et al. |
| 2010/0142598 A1 | 6/2010 | Murray et al. |
| 2010/0142955 A1 | 6/2010 | Yu et al. |
| 2010/0144285 A1 | 6/2010 | Behzad et al. |
| 2010/0148373 A1 | 6/2010 | Chandrasekaran |
| 2010/0150556 A1 | 6/2010 | Soto et al. |
| 2010/0156721 A1 | 6/2010 | Alamouti et al. |
| 2010/0158525 A1 | 6/2010 | Walter |
| 2010/0159859 A1 | 6/2010 | Rofougaran |
| 2010/0188998 A1 | 7/2010 | Pernu et al. |
| 2010/0189439 A1 | 7/2010 | Novak et al. |
| 2010/0190509 A1 | 7/2010 | Davis |
| 2010/0202326 A1 | 8/2010 | Rofougaran et al. |
| 2010/0208656 A1 | 8/2010 | Oh |
| 2010/0225413 A1 | 9/2010 | Rofougaran et al. |
| 2010/0225520 A1 | 9/2010 | Mohamadi et al. |
| 2010/0225556 A1 | 9/2010 | Rofougaran et al. |
| 2010/0225557 A1 | 9/2010 | Rofougaran et al. |
| 2010/0232323 A1 | 9/2010 | Kubler et al. |
| 2010/0246558 A1 | 9/2010 | Harel |
| 2010/0255774 A1 | 10/2010 | Kenington |
| 2010/0258949 A1 | 10/2010 | Henderson et al. |
| 2010/0260063 A1 | 10/2010 | Kubler et al. |
| 2010/0261501 A1 | 10/2010 | Behzad et al. |
| 2010/0266287 A1 | 10/2010 | Adhikari et al. |
| 2010/0278530 A1 | 11/2010 | Kummetz et al. |
| 2010/0284323 A1 | 11/2010 | Tang et al. |
| 2010/0290355 A1 | 11/2010 | Roy et al. |
| 2010/0309049 A1 | 12/2010 | Reunamäki et al. |
| 2010/0309752 A1 | 12/2010 | Lee et al. |
| 2010/0311472 A1 | 12/2010 | Rofougaran et al. |
| 2010/0311480 A1 | 12/2010 | Raines et al. |
| 2010/0329161 A1 | 12/2010 | Ylanen et al. |
| 2010/0329166 A1 | 12/2010 | Mahany et al. |
| 2010/0329680 A1 | 12/2010 | Presi et al. |
| 2011/0002687 A1 | 1/2011 | Sabat, Jr. et al. |
| 2011/0007724 A1 | 1/2011 | Mahany et al. |
| 2011/0007733 A1 | 1/2011 | Kubler et al. |
| 2011/0008042 A1 | 1/2011 | Stewart |
| 2011/0019999 A1 | 1/2011 | George et al. |
| 2011/0021146 A1 | 1/2011 | Pernu |
| 2011/0021224 A1 | 1/2011 | Koskinen et al. |
| 2011/0026932 A1 | 2/2011 | Yeh et al. |
| 2011/0028161 A1 | 2/2011 | Larsen |
| 2011/0045767 A1 | 2/2011 | Rofougaran et al. |
| 2011/0055875 A1 | 3/2011 | Zussman |
| 2011/0065450 A1 | 3/2011 | Kazmi |
| 2011/0066774 A1 | 3/2011 | Rofougaran |
| 2011/0069668 A1 | 3/2011 | Chion et al. |
| 2011/0071734 A1 | 3/2011 | Van Wiemeersch et al. |
| 2011/0083152 A1 | 4/2011 | Centore, III et al. |
| 2011/0086614 A1 | 4/2011 | Brisebois et al. |
| 2011/0116393 A1 | 5/2011 | Hong et al. |
| 2011/0116572 A1 | 5/2011 | Lee et al. |
| 2011/0116794 A1 | 5/2011 | George et al. |
| 2011/0122912 A1 | 5/2011 | Benjamin et al. |
| 2011/0126071 A1 | 5/2011 | Han et al. |
| 2011/0149879 A1 | 6/2011 | Noriega et al. |
| 2011/0158298 A1 | 6/2011 | Djadi et al. |
| 2011/0158649 A1 | 6/2011 | Hari |
| 2011/0182230 A1 | 7/2011 | Ohm et al. |
| 2011/0194475 A1 | 8/2011 | Kim et al. |
| 2011/0200325 A1 | 8/2011 | Kobyakov et al. |
| 2011/0200328 A1 | 8/2011 | In De Betou et al. |
| 2011/0201368 A1 | 8/2011 | Faccin et al. |
| 2011/0204504 A1 | 8/2011 | Henderson et al. |
| 2011/0206383 A1 | 8/2011 | Chien et al. |
| 2011/0211439 A1 | 9/2011 | Manpuria et al. |
| 2011/0215901 A1 | 9/2011 | Van Wiemeersch et al. |
| 2011/0222415 A1 | 9/2011 | Ramamurthi et al. |
| 2011/0222434 A1 | 9/2011 | Chen |
| 2011/0222619 A1 | 9/2011 | Ramamurthi et al. |
| 2011/0223961 A1 | 9/2011 | Chen et al. |
| 2011/0227795 A1 | 9/2011 | Lopez et al. |
| 2011/0244887 A1 | 10/2011 | Dupray et al. |
| 2011/0244914 A1 | 10/2011 | Venkatraman et al. |
| 2011/0256878 A1 | 10/2011 | Zhu et al. |
| 2011/0268033 A1 | 11/2011 | Boldi et al. |
| 2011/0268446 A1* | 11/2011 | Cune ............... H04B 10/25753 398/79 |
| 2011/0268449 A1 | 11/2011 | Berlin et al. |
| 2011/0274021 A1 | 11/2011 | He et al. |
| 2011/0281536 A1 | 11/2011 | Lee et al. |
| 2011/0312340 A1 | 12/2011 | Wu et al. |
| 2012/0069880 A1 | 3/2012 | Lemson et al. |
| 2012/0134673 A1 | 5/2012 | Palanisamy et al. |
| 2012/0177026 A1 | 7/2012 | Uyehara et al. |
| 2012/0196611 A1 | 8/2012 | Venkatraman et al. |
| 2012/0208581 A1 | 8/2012 | Ishida et al. |
| 2012/0230695 A1 | 9/2012 | O'Krafka et al. |
| 2012/0257893 A1 | 10/2012 | Boyd et al. |
| 2012/0281565 A1 | 11/2012 | Sauer |
| 2012/0294208 A1 | 11/2012 | Rofougaran et al. |
| 2012/0314665 A1 | 12/2012 | Ishida et al. |
| 2012/0321305 A1 | 12/2012 | George et al. |
| 2013/0012195 A1 | 1/2013 | Sabat, Jr. et al. |
| 2013/0053050 A1 | 2/2013 | Kang et al. |
| 2013/0077580 A1 | 3/2013 | Kang et al. |
| 2013/0089332 A1 | 4/2013 | Sauer et al. |
| 2013/0094439 A1 | 4/2013 | Moshfeghi |
| 2013/0095871 A1 | 4/2013 | Soriaga et al. |
| 2013/0095873 A1 | 4/2013 | Soriaga et al. |
| 2013/0142054 A1 | 6/2013 | Ahmadi |
| 2013/0195467 A1 | 8/2013 | Schmid et al. |
| 2013/0210490 A1 | 8/2013 | Fischer et al. |
| 2013/0236180 A1 | 9/2013 | Kim et al. |
| 2013/0249292 A1 | 9/2013 | Blackwell, Jr. et al. |
| 2014/0016583 A1 | 1/2014 | Smith |
| 2014/0024402 A1 | 1/2014 | Singh |
| 2014/0072064 A1 | 3/2014 | Lemson et al. |
| 2014/0086082 A1 | 3/2014 | Kim et al. |
| 2014/0113671 A1 | 4/2014 | Schwengler |
| 2014/0118464 A1 | 5/2014 | George et al. |
| 2014/0119735 A1 | 5/2014 | Cune et al. |
| 2014/0140225 A1 | 5/2014 | Wala |
| 2014/0146692 A1 | 5/2014 | Hazani et al. |
| 2014/0146797 A1 | 5/2014 | Zavadsky et al. |
| 2014/0146905 A1 | 5/2014 | Zavadsky et al. |
| 2014/0146906 A1 | 5/2014 | Zavadsky et al. |
| 2014/0153919 A1 | 6/2014 | Casterline et al. |
| 2014/0162664 A1 | 6/2014 | Stapleton et al. |
| 2014/0194135 A1 | 7/2014 | Terry |
| 2014/0219140 A1 | 8/2014 | Uyehara et al. |
| 2014/0233435 A1 | 8/2014 | Ko |
| 2014/0243033 A1 | 8/2014 | Wala et al. |
| 2014/0274184 A1 | 9/2014 | Regan |
| 2015/0037041 A1 | 2/2015 | Cune et al. |
| 2015/0055954 A1 | 2/2015 | Gronvall et al. |
| 2015/0119079 A1 | 4/2015 | Tarlazzi et al. |

(56) References Cited

U.S. PATENT DOCUMENTS

| | | | |
|---|---|---|---|
| 2016/0135184 A1 | 5/2016 | Zavadsky et al. |
| 2016/0174345 A1 | 6/2016 | Kelly et al. |
| 2016/0270032 A1 | 9/2016 | Guevin |
| 2016/0309340 A1 | 10/2016 | Malach |
| 2016/0365897 A1 | 12/2016 | Gross et al. |
| 2016/0366587 A1 | 12/2016 | Gross et al. |
| 2017/0047998 A1 | 2/2017 | Palanisamy et al. |
| 2017/0222691 A1 | 8/2017 | Gross et al. |
| 2017/0244507 A1 | 8/2017 | Hannan |
| 2017/0245162 A1 | 8/2017 | Beck et al. |
| 2017/0257833 A1 | 9/2017 | Hannan et al. |

FOREIGN PATENT DOCUMENTS

| | | |
|---|---|---|
| CA | 2065090 C | 2/1998 |
| CA | 2242707 A1 | 1/1999 |
| CN | 1207841 A | 2/1999 |
| CN | 1230311 A | 9/1999 |
| CN | 1980088 A | 6/2007 |
| CN | 101043276 A | 9/2007 |
| CN | 101340647 A | 1/2009 |
| CN | 101389147 A | 3/2009 |
| CN | 101389148 A | 3/2009 |
| CN | 101547447 A | 9/2009 |
| DE | 20104862 U1 | 8/2001 |
| DE | 10249414 A1 | 5/2004 |
| EP | 0477952 A2 | 4/1992 |
| EP | 0477952 A3 | 4/1992 |
| EP | 0461583 B1 | 3/1997 |
| EP | 851618 A2 | 7/1998 |
| EP | 0687400 B1 | 11/1998 |
| EP | 0899976 A2 | 3/1999 |
| EP | 0993124 A2 | 4/2000 |
| EP | 0994582 A1 | 4/2000 |
| EP | 1037411 A2 | 9/2000 |
| EP | 1089586 A2 | 4/2001 |
| EP | 1179895 A1 | 2/2002 |
| EP | 1267447 A1 | 12/2002 |
| EP | 1347584 A2 | 9/2003 |
| EP | 1363352 A1 | 11/2003 |
| EP | 1391897 A1 | 2/2004 |
| EP | 1443687 A1 | 8/2004 |
| EP | 1455550 A2 | 9/2004 |
| EP | 1501206 A1 | 1/2005 |
| EP | 1503451 A1 | 2/2005 |
| EP | 1530316 A1 | 5/2005 |
| EP | 1511203 B1 | 3/2006 |
| EP | 1267447 B1 | 8/2006 |
| EP | 1693974 A1 | 8/2006 |
| EP | 1742388 A1 | 1/2007 |
| EP | 1227605 B1 | 1/2008 |
| EP | 1916806 A1 | 4/2008 |
| EP | 1954019 A1 | 8/2008 |
| EP | 1968250 A1 | 9/2008 |
| EP | 1056226 B1 | 4/2009 |
| EP | 1357683 B1 | 5/2009 |
| EP | 2276298 A1 | 1/2011 |
| EP | 1570626 B1 | 11/2013 |
| GB | 2319439 A | 5/1998 |
| GB | 2323252 A | 9/1998 |
| GB | 2370170 A | 6/2002 |
| GB | 2399963 A | 9/2004 |
| GB | 2428149 A | 1/2007 |
| JP | H4189036 A | 7/1992 |
| JP | 05260018 A | 10/1993 |
| JP | 09083450 A | 3/1997 |
| JP | 09162810 A | 6/1997 |
| JP | 09200840 A | 7/1997 |
| JP | 11068675 A | 3/1999 |
| JP | 2000152300 A | 5/2000 |
| JP | 2000341744 A | 12/2000 |
| JP | 2002264617 A | 9/2002 |
| JP | 2002353813 A | 12/2002 |
| JP | 2003148653 A | 5/2003 |
| JP | 2003172827 A | 6/2003 |
| JP | 2004172734 | 6/2004 |
| JP | 2004222297 A | 8/2004 |
| JP | 2004245963 A | 9/2004 |
| JP | 2004247090 A | 9/2004 |
| JP | 2004264901 A | 9/2004 |
| JP | 2004265624 A | 9/2004 |
| JP | 2004317737 A | 11/2004 |
| JP | 2004349184 A | 12/2004 |
| JP | 2005018175 A | 1/2005 |
| JP | 2005087135 A | 4/2005 |
| JP | 2005134125 A | 5/2005 |
| JP | 2007228603 A | 9/2007 |
| JP | 2008172597 A | 7/2008 |
| KR | 20010055088 A | 7/2001 |
| WO | 9603823 A1 | 2/1996 |
| WO | 9810600 A1 | 3/1998 |
| WO | 00042721 A1 | 7/2000 |
| WO | 0072475 A1 | 11/2000 |
| WO | 0178434 A1 | 10/2001 |
| WO | 0184760 A1 | 11/2001 |
| WO | 0209363 A2 | 1/2002 |
| WO | 0221183 A1 | 3/2002 |
| WO | 0230141 A1 | 4/2002 |
| WO | 02102102 A1 | 12/2002 |
| WO | 03024027 A1 | 3/2003 |
| WO | 03098175 A1 | 11/2003 |
| WO | 2004030154 A2 | 4/2004 |
| WO | 2004034098 A2 | 4/2004 |
| WO | 2004047472 A1 | 6/2004 |
| WO | 2004056019 A1 | 7/2004 |
| WO | 2004059934 A1 | 7/2004 |
| WO | 2004086795 A2 | 10/2004 |
| WO | 2004093471 A2 | 10/2004 |
| WO | 2005062505 A1 | 7/2005 |
| WO | 2005069203 A2 | 7/2005 |
| WO | 2005073897 A1 | 8/2005 |
| WO | 2005079386 A2 | 9/2005 |
| WO | 2005101701 A1 | 10/2005 |
| WO | 2005111959 A2 | 11/2005 |
| WO | 2006011778 A1 | 2/2006 |
| WO | 2006018592 A1 | 2/2006 |
| WO | 2006019392 A1 | 2/2006 |
| WO | 2006039941 A1 | 4/2006 |
| WO | 2006051262 A1 | 5/2006 |
| WO | 2006060754 A2 | 6/2006 |
| WO | 2006077569 A1 | 7/2006 |
| WO | 2006105185 A2 | 10/2006 |
| WO | 2006133609 A1 | 12/2006 |
| WO | 2006136811 A1 | 12/2006 |
| WO | 2007048427 A1 | 5/2007 |
| WO | 2007077451 A1 | 7/2007 |
| WO | 2007088561 A1 | 8/2007 |
| WO | 2007091026 A1 | 8/2007 |
| WO | 2007133507 A2 | 11/2007 |
| WO | 2008008249 A2 | 1/2008 |
| WO | 2008027213 A2 | 3/2008 |
| WO | 2008033298 A2 | 3/2008 |
| WO | 2008039830 A2 | 4/2008 |
| WO | 2008116014 A2 | 9/2008 |
| WO | 2006046088 A1 | 5/2009 |
| WO | 20090132824 A2 | 11/2009 |
| WO | 2010090999 A1 | 8/2010 |
| WO | 2010132739 A1 | 11/2010 |
| WO | 2011023592 A1 | 3/2011 |
| WO | 2011059705 A1 | 5/2011 |
| WO | 2011100095 A1 | 8/2011 |
| WO | 2011139939 A1 | 11/2011 |
| WO | 2011139942 A1 | 11/2011 |
| WO | 2011152831 A1 | 12/2011 |
| WO | WO2011/152831 | * 12/2011 ....... H04B 10/25753 |
| WO | 2012148938 A1 | 11/2012 |
| WO | 2012148940 A1 | 11/2012 |

(56) References Cited

FOREIGN PATENT DOCUMENTS

| WO | 2013122915 A1 | 8/2013 |
|---|---|---|
| WO | 2017112807 A1 | 6/2017 |

OTHER PUBLICATIONS

Examination Report for European patent application 10702806.0 dated Sep. 12, 2013, 11 pages.
Non-final Office Action for U.S. Appl. No. 13/194,429 dated Mar. 1, 2013, 22 pages.
Notice of Allowance for U.S. Appl. No. 13/194,429 dated Jul. 9, 2013, 9 pages.
Author Unknown, "VCSEL Chaotic Synchronization and Modulation Characteristics," Master's Thesis, Southwest Jiatong University, Professor Pan Wei, Apr. 2006, 8 pages (machine translation).
Chowdhury et al., "Multi-service Multi-carrier Broadband MIMO Distributed Antenna Systems for In-building Optical Wireless Access," Presented at the 2010 Conference on Optical Fiber Communication and National Fiber Optic Engineers Conference, Mar. 21-25, 2010, San Diego, California, IEEE, pp. 1-3.
Examiner's Answer to the Appeal Brief for U.S. Appl. No. 12/712,758 dated Jul. 7, 2014, 12 pages.
Notice of Allowance for U.S. Appl. No. 13/592,502 dated May 9, 2014, 9 pages.
International Search Report for PCT/US2011/034733 dated Aug. 1, 2011, 5 pages.
International Preliminary Report on Patentability for PCT/US2011/034733 dated Nov. 6, 2012, 7 pages.
Translation of the First Office Action for Chinese Patent Application No. 201180008168.1, dated Jun. 5, 2014, 9 pages.
Notification of First Office Action for Chinese Patent Application No. 201010557770.8, dated Jul. 3, 2014, 14 pages.
Non-final Office Action for U.S. Appl. No. 12/618,613 dated Dec. 29, 2011, 10 pages.
Non-final Office Action for U.S. Appl. No. 12/618,613 dated Jul. 5, 2012, 9 pages.
Translation of the First Office Action for Chinese Patent Application No. 201080055264.7, dated Jun. 5, 2014, 6 pages.
Extended European Search Report for European patent application 12777604.5 dated Oct. 1, 2014, 7 pages.
Extended European Search Report for European patent application 12776915.6 dated Oct. 13, 2014, 7 pages.
Biton et al., "Challenge: CeTV and Ca-Fi—Cellular and Wi-Fi over CATV," Proceedings of the Eleventh Annual International Conference on Mobile Computing and Networking, Aug. 28-Sep. 2, 2005, Cologne, Germany, Association for Computing Machinery, 8 pages.
Seto et al., "Optical Subcarrier Multiplexing Transmission for Base Station With Adaptive Array Antenna," IEEE Transactions on Microwave Theory and Techniques, vol. 49, No. 10, Oct. 2001, pp. 2036-2041.
Notice of Reexamination for Chinese patent application 20078002293.6 dated Nov. 28, 2014, 22 pages.
Examination Report for European patent application 10702806.0 dated Nov. 14, 2014, 7 pages.
Decision on Appeal for U.S. Appl. No. 11/406,976, dated Nov. 3, 2014, 6 pages.
Non-final Office Action for U.S. Appl. No. 13/688,448 dated Dec. 29, 2014, 16 pages.
Non-final Office Action for U.S. Appl. No. 14/063,245 dated Jan. 26, 2015, 22 pages.
Toycan, M. et al., "Optical network architecture for UWB range extension beyond a single complex of cells," Presented at the 33rd European Conference and Exhibition of Optical Communication, Sep. 16-20, 2007, Berlin, Germany, VDE, 2 pages.
Notice of Second Office Action for Chinese Patent Application No. 201010557770.8, dated Mar. 10, 2015, 13 pages.
Official Communication from the European Patent Office for 10779113.9, dated Jun. 20, 2012, 2 pages.
International Search Report for PCT/US2007/011034, dated Apr. 3, 2008, 2 pages.
International Preliminary Report on Patentability for PCT/US2007/011034, dated Nov. 11, 2008, 8 pages.
International Search Report for PCT/US2013/037090, dated Jul. 22, 2013, 4 pages.
Non-Final Office Action for U.S. Appl. No. 11/430,113, dated Apr. 10, 2008, 6 pages.
Notice of Allowance for U.S. Appl. No. 11/430,113, dated Dec. 8, 2008, 9 pages.
Non-Final Office Action for U.S. Appl. No. 13/595,099, dated Jun. 20, 2013, 9 pages.
Notice of Allowance for U.S. Appl. No. 13/915,882, dated Apr. 10, 2015, 12 pages.
Final Office Action for U.S. Appl. No. 14/063,245, dated Apr. 16, 2015, 24 pages.
Advisory Action for U.S. Appl. No. 14/063,245, dated Jun. 8, 2015, 3 pages.
Non-Final Office Action for U.S. Appl. No. 14/146,949, dated Dec. 3, 2014, 14 pages.
Non-Final Office Action for U.S. Appl. No. 14/146,949, dated Apr. 14, 2015, 16 pages.
Author Unknown, "The I2C-Bus Specification," Version 2.1, Jan. 2000, Philips Semiconductors, 46 pages.
Notice of Third Office Action for Chinese Patent Application 201010557770.8 dated Sep. 23, 2015, 15 pages.
International Search Report for PCT/US2010/054234, dated Feb. 28, 2011, 4 pages.
Notice of Allowance for U.S. Appl. No. 14/062,289, dated Jul. 8, 2015, 9 pages.
Non-final Office Action for U.S. Appl. No. 14/063,630 dated Jul. 10, 2015, 19 pages.
Non-final Office Action for U.S. Appl. No. 14/172,240 dated Jun. 5, 2015, 14 pages.
Final Office Action for U.S. Appl. No. 14/172,240 dated Oct. 9, 2015, 23 pages.
Non-final Office Action for U.S. Appl. No. 14/465,565 dated Jun. 26, 2015, 15 pages.
Decision on Rejection for Chinese Patent Application No. 201010557770.8, dated Jan. 27, 2016, 16 pages.
Translation of the First Office Action for Chinese Patent Application No. 201280024385.4, dated Jan. 28, 2016, 6 pages.
Notice of Allowance for U.S. Appl. No. 14/465,565, dated Dec. 11, 2015, 8 pages.
Non-final Office Action for U.S. Appl. No. 14/063,630, dated Dec. 14, 2015, 17 pages.
Advisory Action for U.S. Appl. No. 14/172,240 dated Dec. 30, 2015, 3 pages.
Attygalle et al., "Extending Optical Transmission Distance in Fiber Wireless Links Using Passive Filtering in Conjunction with Optimized Modulation," Journal of Lightwave Technology, vol. 24, No. 4, Apr. 2006, 7 pages.
Bo Zhang et al., "Reconfigurable Multifunctional Operation Using Optical Injection-Locked Vertical-Cavity Surface-Emitting Lasers," Journal of Lightwave Technology, vol. 27, No. 15, Aug. 2009, 6 pages.
Chang-Hasnain, et al., "Ultrahigh-speed laser modulation by injection locking," Chapter 6, Optical Fiber Telecommunication V A: Components and Subsystems, Elsevier Inc., 2008, 20 pages.
Cheng Zhang et al., "60 GHz Millimeter-wave Generation by Two-mode Injection-locked Fabry-Perot Laser Using Second-Order Sideband Injection in Radio-over-Fiber System," Conference on Lasers and Electro-Optics and Quantum Electronics, Optical Society of America, May 2008, 2 pages.
Chrostowski, "Optical Injection Locking of Vertical Cavity Surface Emitting Lasers," Fall 2003, PhD dissertation University of California at Berkely, 122 pages.
Dang et al., "Radio-over-Fiber based architecture for seamless wireless indoor communication in the 60GHz band," Computer Communications, Elsevier B.V., Amsterdam, NL, vol. 30, Sep. 8, 2007, pp. 3598-3613.

(56) References Cited

OTHER PUBLICATIONS

Hyuk-Kee Sung et al., "Optical Single Sideband Modulation Using Strong Optical Injection-Locked Semiconductor Lasers," IEEE Photonics Technology Letters, vol. 19, No. 13, Jul. 1, 2007, 4 pages.
Lim et al., "Analysis of Optical Carrier-to-Sideband Ratio for Improving Transmission Performance in Fiber-Radio Links," IEEE Transactions of Microwave Theory and Techniques, vol. 54, No. 5, May 2006, 7 pages.
Lu H H et al., "Improvement of radio-on-multimode fiber systems based on light injection and optoelectronic feedback techniques," Optics Communications, vol. 266, No. 2, Elsevier B.V., Oct. 15, 2006, 4 pages.
Pleros et al., "A 60 GHz Radio-Over-Fiber Network Architecture for Seamless Communication With High Mobility," Journal of Lightwave Technology, vol. 27, No. 12, IEEE, Jun. 15, 2009, pp. 1957-1967.
Reza et al., "Degree-of-Polarization-Based PMD Monitoring for Subcarrier-Multiplexed Signals Via Equalized Carrier/Sideband Filtering," Journal of Lightwave Technology, vol. 22, No. 4, IEEE, Apr. 2004, 8 pages.
Zhao, "Optical Injection Locking on Vertical-Cavity Surface-Emitting Lasers (VCSELs): Physics and Applications," Fall 2008, PhD dissertation University of California at Berkeley, pp. 1-209.
Advisory Action for U.S. Appl. No. 12/712,758 dated Sep. 16, 2013, 3 pages.
Final Office Action for U.S. Appl. No. 12/712,758 dated May 24, 2013, 17 pages.
Non-final Office Action for U.S. Appl. No. 12/712,758 dated Jan. 10, 2012, 14 pages.
Examination Report for European patent application 07835803.3 dated Aug. 13, 2013, 6 pages.
Extended European Search Report for patent application 10014262.9 dated Mar. 14, 2011, 6 pages.
International Search Report and Written Opinion for PCT/US2012/034853 dated Aug. 6, 2012, 12 pages.
International Search Report and Written Opinion for PCT/US2012/034855 dated Jul. 26, 2012, 10 pages.
Written Opinion of the International Searching Authority for European patent application 11701916.6 dated Sep. 21, 2012, 10 pages.
International Search Report for PCT/US2011/021799 dated Apr. 6, 2011, 4 pages.
Arredondo, Albedo et al., "Techniques for Improving In-Building Radio Coverage Using Fiber-Fed Distributed Antenna Networks," IEEE 46th Vehicular Technology Conference, Atlanta, Georgia, Apr. 28-May 1, 1996, pp. 1540-1543, vol. 3.
Bakaul, M., et al., "Efficient Multiplexing Scheme for Wavelength-Interleaved DWDM Millimeter-Wave Fiber-Radio Systems," IEEE Photonics Technology Letters, Dec. 2005, vol. 17, No. 12, pp. 2718-2720.
Cho, Bong Youl et al. "The Forward Link Performance of a PCS System with an AGC," 4th CDMA International Conference and Exhibition, "The Realization of IMT-2000," 1999, 10 pages.
Chu, Ta-Shing et al. "Fiber optic microcellular radio", IEEE Transactions on Vehicular Technology, Aug. 1991, pp. 599-606, vol. 40, Issue 3.
Cooper, A.J., "Fiber/Radio for the Provision of Cordless/Mobile Telephony Services in the Access Network," Electronics Letters, 1990, pp. 2054-2056, vol. 26.
Cutrer, David M. et al., "Dynamic Range Requirements for Optical Transmitters in Fiber-Fed Microcellular Networks," IEEE Photonics Technology Letters, May 1995, pp. 564-566, vol. 7, No. 5.
Dolmans, G. et al. "Performance study of an adaptive dual antenna handset for indoor communications", IEE Proceedings: Microwaves, Antennas and Propagation, Apr. 1999, pp. 138-144, vol. 146, Issue 2.
Ellinger, Frank et al., "A 5.2 GHz variable gain LNA MMIC for adaptive antenna combining", IEEE MTT-S International Microwave Symposium Digest, Anaheim, California, Jun. 13-19, 1999, pp. 501-504, vol. 2.

Fan, J.C. et al., "Dynamic range requirements for microcellular personal communication systems using analog fiber-optic links", IEEE Transactions on Microwave Theory and Techniques, Aug. 1997, pp. 1390-1397, vol. 45, Issue 8.
Gibson, B.C., et al., "Evanescent Field Analysis of Air-Silica Microstructure Waveguides," The 14th Annual Meeting of the IEEE Lasers and Electro-Optics Society, 1-7803-7104-4/01, Nov. 12-13, 2001, vol. 2, pp. 709-710.
Huang, C., et al., "A WLAN-Used Helical Antenna Fully Integrated with the PCMCIA Carrier," IEEE Transactions on Antennas and Propagation, Dec. 2005, vol. 53, No. 12, pp. 4164-4168.
Kojucharow, K., et al., "Millimeter-Wave Signal Properties Resulting from Electrooptical Upconversion," IEEE Transaction on Microwave Theory and Techniques, Oct. 2001, vol. 49, No. 10, pp. 1977-1985.
Monro, T.M., et al., "Holey Fibers with Random Cladding Distributions," Optics Letters, Feb. 15, 2000, vol. 25, No. 4, pp. 206-208.
Moreira, J.D., et al., "Diversity Techniques for OFDM Based WLAN Systems," The 13th IEEE International Symposium on Personal, Indoor and Mobile Radio Communications, Sep. 15-18, 2002, vol. 3, pp. 1008-1011.
Niiho, T., et al., "Multi-Channel Wireless LAN Distributed Antenna System Based on Radio-Over-Fiber Techniques," The 17th Annual Meeting of the IEEE Lasers and Electro-Optics Society, Nov. 2004, vol. 1, pp. 57-58.
Author Unknown, "ITU-T G.652, Telecommunication Standardization Sector of ITU, Series G: Transmission Systems and Media, Digital Systems and Networks, Transmission Media and Optical Systems Characteristics—Optical Fibre Cables, Characteristics of a Single-Mode Optical Fiber and Cable," ITU-T Recommendation G.652, International Telecommunication Union, Jun. 2005, 22 pages.
Author Unknown, "ITU-T G.657, Telecommunication Standardization Sector of ITU, Dec. 2006, Series G: Transmission Systems and Media, Digital Systems and Networks, Transmission Media and Optical Systems Characteristics—Optical Fibre Cables, Characteristics of a Bending Loss Insensitive Single Mode Optical Fibre and Cable for the Access Network," ITU-T Recommendation G.657, International Telecommunication Union, 20 pages.
International Search Report and Written Opinion for International patent application PCT/US2007/013802 dated May 8, 2008, 12 pages.
Opatic, D., "Radio over Fiber Technology for Wireless Access," Ericsson, Oct. 17, 2009, 6 pages.
Paulraj, A.J., et al., "An Overview of MIMO Communications—A Key to Gigabit Wireless," Proceedings of the IEEE, Feb. 2004, vol. 92, No. 2, 34 pages.
Pickrell, G.R., et al., "Novel Techniques for the Fabrication of Holey Optical Fibers," Proceedings of SPIE, Oct. 28-Nov. 2, 2001, vol. 4578, 2001, pp. 271-282.
Roh, W., et al., "MIMO Channel Capacity for the Distributed Antenna Systems," Proceedings of the 56th IEEE Vehicular Technology Conference, Sep. 2002, vol. 2, pp. 706-709.
Schweber, Bill, "Maintaining cellular connectivity indoors demands sophisticated design," EDN Network, Dec. 21, 2000, 2 pages, http://www.edn.com/design/integrated-circuit-design/4362776/Maintaining-cellular-connectivity-indoors-demands-sophisticated-design.
Seto, I., et al., "Antenna-Selective Transmit Diversity Technique for OFDM-Based WLANs with Dual-Band Printed Antennas," 2005 IEEE Wireless Communications and Networking Conference, Mar. 13-17, 2005, vol. 1, pp. 51-56.
Shen, C., et al., "Comparison of Channel Capacity for MIMO-DAS versus MIMO-CAS," The 9th Asia-Pacific Conference on Communications, Sep. 21-24, 2003, vol. 1, pp. 113-118.
Wake, D. et al., "Passive Picocell: A New Concept n Wireless Network Infrastructure," Electronics Letters, Feb. 27, 1997, vol. 33, No. 5, pp. 404-406.
Windyka, John et al., "System-Level Integrated Circuit (SLIC) Technology Development for Phased Array Antenna Applications," Contractor Report 204132, National Aeronautics and Space Administration, Jul. 1997, 94 pages.

(56) References Cited

OTHER PUBLICATIONS

Winters, J., et al., "The Impact of Antenna Diversity on the Capacity of Wireless Communications Systems," IEEE Transcations on Communications, vol. 42, No. 2/3/4, Feb./Mar./Apr. 1994, pp. 1740-1751.
Yu et al., "A Novel Scheme to Generate Single-Sideband Millimeter-Wave Signals by Using Low-Frequency Local Oscillator Signal," IEEE Photonics Technology Letters, vol. 20, No. 7, Apr. 1, 2008, pp. 478-480.
Second Office Action for Chinese patent application 20078002293.6 dated Aug. 30, 2012, 10 pages.
International Search Report for PCT/US2010/022847 dated Jul. 12, 2010, 3 pages.
International Search Report for PCT/US2010/022857 dated Jun. 18, 2010, 3 pages.
Decision on Appeal for U.S. Appl. No. 11/451,237 dated Mar. 19, 2013, 7 pages.
Decision on Rejection for Chinese patent application 200780022093.6 dated Feb. 5, 2013, 9 pages.
Non-final Office Action for U.S. Appl. No. 14/518,574, dated Jan. 6, 2016, 16 pages.
Non-final Office Action for U.S. Appl. No. 14/493,966, dated Jan. 15, 2016, 12 pages.
Notice of Allowance for U.S. Appl. No. 14/936,007 dated Feb. 22, 2016, 9 pages.
Decision on Appeal for U.S. Appl. No. 12/712,758 dated Jun. 27, 2016, 15 pages.
Final Office Action for U.S. Appl. No. 14/063,630, dated May 12, 2016, 18 pages.
Examiner's Answer to the Appeal Brief for U.S. Appl. No. 14/172,240 dated Jul. 1, 2016, 34 pages.
Final Office Acttion for U.S. Appl. No. 14/518,574, dated May 12, 2016, 24 pages.
Final Office Action for U.S. Appl. No. 14/493,966, dated Jun. 2, 2016, 11 pages.
Non-final Office Action for U.S. Appl. No. 14/966,243 dated Jan. 25, 2016, 16 pages.
Notice of Allowance for U.S. Appl. No. 14/966,243 dated Jun. 21, 2016, 8 pages.
Translation of the First Office Action for Chinese Patent Application No. 201280028800.3, dated Jul. 22, 2016, 8 pages.
International Search Report for PCT/IL2016/050368, dated Aug. 9, 2016, 7 pages.
Notice of Allowance for U.S. Appl. No. 14/063,630, dated Jul. 29, 2016, 9 pages.
Non-final Office Action for U.S. Appl. No. 14/518,574, dated Aug. 11, 2016, 13 pages.
Final Office Action for U.S. Appl. No. 14/518,574, dated Dec. 29, 2016, 18 pages.
Non-Final Office Action for U.S. Appl. No. 14/687,423, dated Oct. 14, 2016, 9 pages.
Non-final Office Action for U.S. Appl. No. 14/822,991, dated Sep. 23, 2016, 5 pages.
Non-Final Office Action for U.S. Appl. No. 14/862,635, dated Nov. 16, 2016, 18 pages.
Non-Final Office Action for U.S. Appl. No. 15/283,974, dated Nov. 2, 2016, 42 pages.
Author Unknown, "Fiber Optic Distributed Antenna System," Installation and Users Guide, ERAU Version 1.5, May 2002, Andrews Corporation, 53 pages.
Notice of Reexamination for Chinese Patent Application No. 201010557770.8, dated Dec. 21, 2016, 22 pages.
Examination Report for European Patent Application No. 11701916.6, dated Jan. 5, 2017, 6 pages.
Advisory Action for U.S. Appl. No. 14/518,574, dated Mar. 22, 2017, 3 pages.
Notice of Allowance for U.S. Appl. No. 14/687,423, dated Apr. 12, 2017, 7 pages.
Notice of Allowance for U.S. Appl. No. 14/822,991, dated Feb. 8, 2017, 11 pages.
Notice of Allowance for U.S. Appl. No. 14/862,635, dated May 24, 2017, 7 pages.
Non-Final Office Action for U.S. Appl. No. 15/179,128, dated Jan. 13, 2017, 7 pages.
Notice of Allowance for U.S. Appl. No. 15/179,128, dated Jun. 9, 2017, 10 pages.
Non-Final Office Action for U.S. Appl. No. 15/207,759, dated May 4, 2017, 20 pages.
Examination Report for European Patent Application No. 10702806.0, dated Nov. 5, 2015, 6 pages.
Notice of Allowance for U.S. Appl. No. 15/207,759, dated Aug. 25, 2017, 9 pages.
Notice of Allowance for U.S. Appl. No. 15/585,356, dated Oct. 12, 2017, 10 pages.
Non-Final Office Action for U.S. Appl. No. 15/590,216, dated Oct. 25, 2017, 12 pages.
Decision on Appeal for U.S. Appl. No. 14/172,240, dated Dec. 27, 2017, 9 pages.
Notice of Allowance for U.S. Appl. No. 15/207,759, dated Dec. 11, 2017, 9 pages.
Notice of Allowance for U.S. Appl. No. 14/172,240, dated Jan. 18, 2018, 8 pages.
Non-Final Office Action for U.S. Appl. No. 15/795,693, dated Nov. 29, 2017, 19 pages.
Final Office Action for U.S. Appl. No. 15/795,693, dated Apr. 11, 2018, 7 pages.
Notice of Allowance and Examiner-Initiated Interview Summary for U.S. Appl. No. 15/719,703, dated May 31, 2018, 11 pages.
Non-Final Office Action for U.S. Appl. No. 15/867,278, dated Jun. 1, 2018, 6 pages.

\* cited by examiner

DISTRIBUTED ANTENNA SYSTEM ARCHITECTURES

PRIORITY APPLICATION

This application is a continuation of and claims priority to co-pending U.S. patent application Ser. No. 14/518,574, filed on Oct. 20, 2014, which is a continuation of International Application No. PCT/US13/37090, filed on Apr. 18, 2013, which claims the benefit of priority to U.S. Provisional Application No. 61/638,219, filed on Apr. 25, 2012, where are hereby incorporated herein by reference.

BACKGROUND

Field of the Disclosure

The technology of the disclosure relates to distributed antenna systems and alternative powering and connectivity architectures therefor.

Technical Background

Wireless communication is rapidly growing, with increasing demands for high-speed mobile data communication. "Wireless fidelity" or "WiFi" systems and wireless local area networks (WLANs) are being deployed in many different types of areas to communicate with wireless devices called "clients," "client devices," or "wireless client devices." Distributed antenna systems are particularly useful when deployed inside buildings or other indoor environments where client devices may not otherwise be able to receive radio frequency (RF) signals from a source.

One approach to deploying a distributed communications system involves the use of RF antenna coverage areas, or "antenna coverage areas." Antenna coverage areas can have a relatively short range from a few meters up to twenty meters. Combining a number of access point devices creates an array of antenna coverage areas. Because the antenna coverage areas each cover small areas, there are typically only a few users per antenna coverage area. This minimizes the amount of bandwidth shared among users.

One type of distributed communications system for creating antenna coverage areas, called "Radio-over-Fiber" or "RoF," utilizes RF signals sent over optical fibers. Such systems can include a head-end station optically coupled to multiple remote antenna units that each provide antenna coverage areas. The remote antenna units each include RF transceivers coupled to an antenna to transmit RF signals wirelessly, wherein the remote antenna units are coupled to the head-end station via optical fiber links.

It may be desired to provide such optical fiber-based distributed communications systems indoors, such as inside a building or other facility, to provide indoor wireless communication for clients. In such cases, power for the remote antenna units on each floor is often provided from an intermediate distribution frame (IDF) at each floor. Because the remote antenna units may be located at long distances from the IDF, power must be also conveyed over long distances from the IDF to the antenna units. Long power transmission distances lead to high voltage drops, which increases the power requirements for the IDF, as well as the voltage ratings for the transmission cables.

SUMMARY OF THE DETAILED DESCRIPTION

One embodiment of the disclosure relates to a wireless communication system comprising a head end unit and at least one remote at least one remote unit coupled to the head end unit by an optical communication path. The remote unit comprises at least one antenna system, each antenna system being capable of transmitting radio frequency (RF) signals into a coverage area, and an optical network terminal (ONT) component. The ONT component is capable of terminating one or more optical fibers and demultiplexing optical signals into component parts. According to one aspect, the remote unit can be coupled to a power source within the coverage area so that power need not be conveyed over long distances to the remote unit.

An additional embodiment of the disclosure relates to a wireless communication system comprising a head end unit, at least one remote unit coupled to the head end unit by an optical communication path, and at least one ONT optically coupled and electrically coupled to the at least one remote unit. The remote unit comprises a plurality of antenna systems, each antenna system being capable of transmitting RF signals into a coverage area, and a splitter component with at least one input fiber and a plurality of output fibers. The splitter component is capable of routing optical RF data transmissions to the antenna systems.

Yet another embodiment relates to a wireless communication system comprising a head end unit and at least one remote unit coupled to the head end unit by a remote unit optical communication path. The at least one remote unit comprises at least one antenna system capable of transmitting RF signals into a coverage area. The system further comprises at least one ONT optically coupled to the head end unit by an ONT optical communication path, and electrically coupled to a corresponding remote unit. The optical communication paths comprise a splitter component with at least one input fiber and a plurality of output fibers, the splitter component being capable of routing optical RF data transmissions to the at least one remote unit.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings illustrate one or more embodiment(s), and together with the description serve to explain principles and operation of the various embodiments.

BRIEF DESCRIPTION OF THE DRAWINGS

According to common practice, the various features of the drawings discussed below are not necessarily drawn to scale. Dimensions of various features and elements in the drawings may be expanded or reduced to more clearly illustrate the embodiments of the disclosure.

DETAILED DESCRIPTION

The present embodiments combine various cable and hardware infrastructures to address requirements of distributed antenna systems (DAS), fiber-to-the-home (FTTH), multiple dwelling units (MDU), and passive optical LAN (POL). Alternative powering concepts are disclosed, such as using multiple POL or FTTH terminal locations (wall outlet, optical network terminal "ONT", etc.) to provide distributed power sources. The disclosed embodiments combine selected DAS cabling and hardware infrastructures with FTTH, MDU, and POL infrastructures. This arrangement can be used to reduce cost and complexity while eliminating the need for parallel cabling and hardware solutions.

Figure 1:
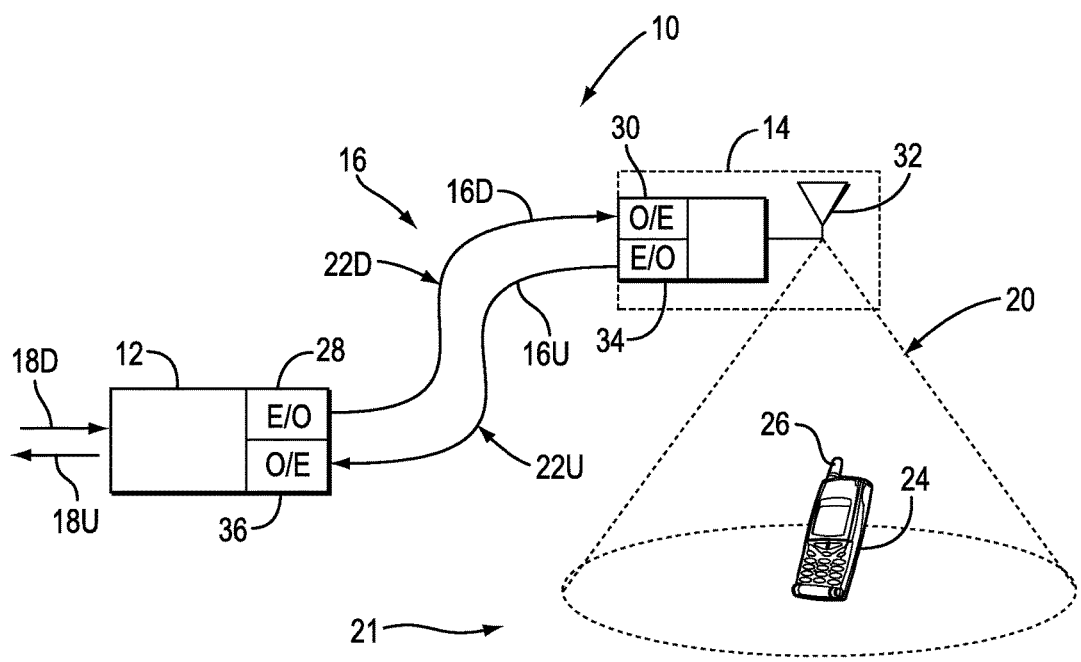
FIG. 1 is a schematic diagram of an exemplary optical fiber-based wireless infrastructure.

FIG. 1 is a schematic diagram of an embodiment of an optical fiber-based distributed antenna system, or "DAS". In this embodiment, the system is an optical fiber-based DAS 10 that is configured to create antenna coverage areas for establishing communications with wireless client devices located in the antenna coverage areas. The optical fiber-based DAS 10 provides RF communications services (e.g., cellular services). The DAS 10 includes head end equipment in the form of a head-end unit (HEU) 12, one or more remote antenna units (RAUs) 14, and an optical fiber 16 that optically couples the HEU 12 to the RAU 14. The HEU 12 is configured to receive communications over downlink electrical RF communications signals 18D from sources, such as a network or carrier, and provide such communications to the RAU 14. The HEU 12 is also configured to return communications received from the RAU 14, via uplink electrical RF communications signals 18U, back to the source or sources. The optical fiber 16 includes at least one downlink optical fiber 16D to carry signals communicated from the HEU 12 to the RAU 14 and at least one uplink optical fiber 16U to carry signals communicated from the RAU 14 back to the HEU 12. One downlink optical fiber 16D and one uplink optical fiber 16U could be provided to support multiple channels each using wavelength-division multiplexing (WDM), as discussed in U.S. patent application Ser. No. 12/892,424.

The antenna coverage area or service area 20 of the RAU 14 forms an RF coverage area 21 substantially centered about the RAU 14. The HEU 12 is adapted to perform a number of wireless applications, including but not limited to Radio-over-Fiber (RoF), radio frequency identification (RFID), wireless local-area network (WLAN) communication, public safety, cellular, telemetry, and other mobile or fixed services. Shown within the antenna service area 20 is a client device 24 in the form of a mobile device which may be a cellular telephone. The client device 24 can be any device that is capable of receiving RF communication signals. The client device 24 includes an antenna 26 (e.g., a wireless card) adapted to receive and/or send electromagnetic RF communications signals.

With continuing reference to FIG. 1, to communicate the electrical RF communications signals over the downlink optical fiber 16D to the RAU 14, to in turn be communicated to the client device 24 in the antenna coverage area 20, the HEU 12 includes an electrical-to-optical (E/O) converter 28. The E/O converter 28 converts the downlink electrical RF communications signals 18D to downlink optical RF communications signals 22D to be communicated over the downlink optical fiber 16D. The RAU 14 includes an optical-to-electrical (O/E) converter 30 to convert received downlink optical RF communications signals 22D back to electrical RF communications signals to be communicated wirelessly through an antenna 32 of the RAU 14 to client devices 24 in the coverage area 20. Similarly, the antenna 32 receives wireless RF communications from client devices 24 and communicates electrical RF communications signals representing the wireless RF communications to an E/O converter 34 in the RAU 14. The E/O converter 34 converts the electrical RF communications signals into uplink optical RF communications signals 22U to be communicated over the uplink optical fiber 16U. An O/E converter 36 provided in the HEU 12 converts the uplink optical RF communications signals 22U into uplink electrical RF communications signals, which can then be communicated as uplink electrical RF communications signals 18U back to a network or other source.

Figure 2:
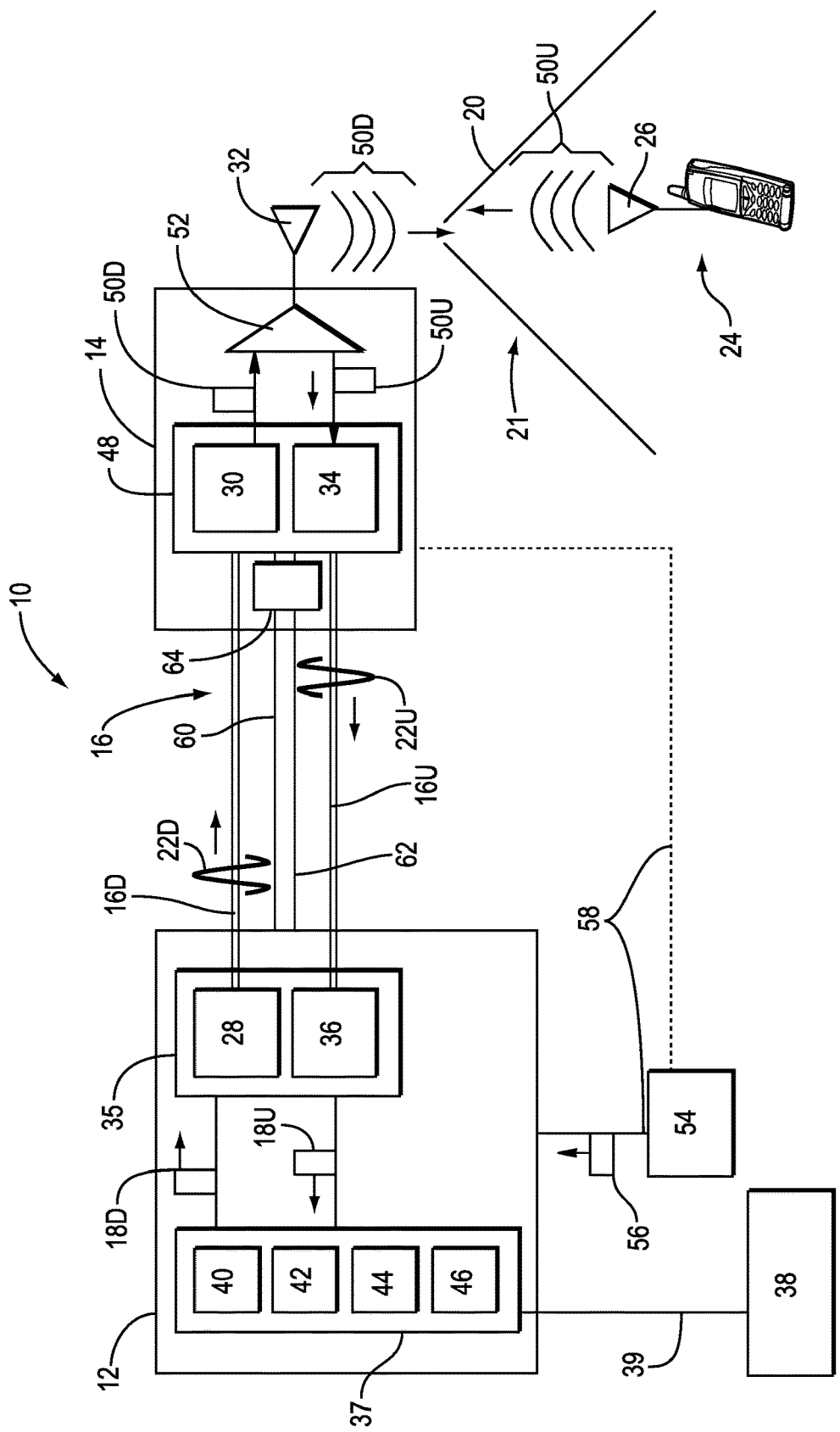
FIG. 2 is a more detailed schematic diagram of exemplary head end equipment and a remote antenna unit (RAU) that can be deployed in the wireless infrastructure of FIG. 1.

FIG. 2 is a more detailed schematic diagram of the DAS 10 of FIG. 1. In this embodiment, the HEU 12 includes a service unit 37 that provides electrical RF service signals by passing such signals from one or more outside networks 38 via a network link 39. In another embodiment, the service unit 37 provides electrical RF service signals by generating the signals directly. In another exemplary embodiment, the service unit 37 coordinates the delivery of the electrical RF service signals between client devices 24 within the antenna coverage area 20. The service unit 37 is electrically coupled to the E/O converter 28 that receives the downlink electrical RF communications signals 18D from the service unit 37 and converts them to corresponding downlink optical RF communications signals 22D.

The HEU 12 also includes the O/E converter 36, which is electrically coupled to the service unit 37. The O/E converter 36 receives the uplink optical RF communications signals 22U and converts them to corresponding uplink electrical RF communications signals 18U. The service unit 37 in the HEU 12 can include an RF communications signal conditioner unit 40 for conditioning the downlink electrical RF communications signals 18D and the uplink electrical RF communications signals 18U, respectively. The service unit 37 can include a digital signal processing unit ("digital signal processor" or "DSP") 42 for providing to the RF communications signal conditioner unit 40 an electrical signal that is modulated onto an RF carrier to generate a desired downlink electrical RF communications signal 18D. The DSP 42 is also configured to process a demodulation signal provided by the demodulation of the uplink electrical RF communications signal 18U by the RF communications signal conditioner unit 40. The service unit 37 in the HEU 12 can also include a central processing unit (CPU) 44 for processing data and otherwise performing logic and computing operations, and a memory unit 46 for storing data. The RAU 14 also includes a converter pair 48 comprising the O/E converter 30 and the E/O converter 34. The O/E converter 30 converts the received downlink optical RF communications signals 22D from the HEU 12 back into downlink electrical RF communications signals 50D. The E/O converter 34 converts uplink electrical RF communications signals 50U received from the client device 24 into the uplink optical RF communications signals 22U to be communicated to the HEU 12. The O/E converter 30 and the E/O converter 34 are electrically coupled to the antenna 32 via an RF signal-directing element 52, such as a circulator. The RF signal-directing element 52 directs the downlink electrical RF communications signals 50D and the uplink electrical RF communications signals 50U.

With continuing reference to FIG. 2, the DAS 10 also includes a power supply 54 that generates an electrical power signal 56. The power supply 54 is electrically coupled to the HEU 12 for powering the power-consuming elements therein. In an exemplary embodiment, an electrical power line 58 runs through the HEU 12 and over to the RAU 14 to power the O/E converter 30 and the E/O converter 34 in the converter pair 48, the optional RF signal-directing element 52 (unless the RF signal-directing element 52 is a passive device), and any other power-consuming elements provided. The electrical power line 58 can include two wires 60 and 62 that carry a single voltage and that are electrically coupled to a DC power converter 64 at the RAU 14. The DC power converter 64 is electrically coupled to the O/E converter 30 and the E/O converter 34 in the converter pair 48, and changes the voltage or levels of the electrical power signal 56 to the power level(s) required by the power-consuming components in the RAU 14.

Figure 3:
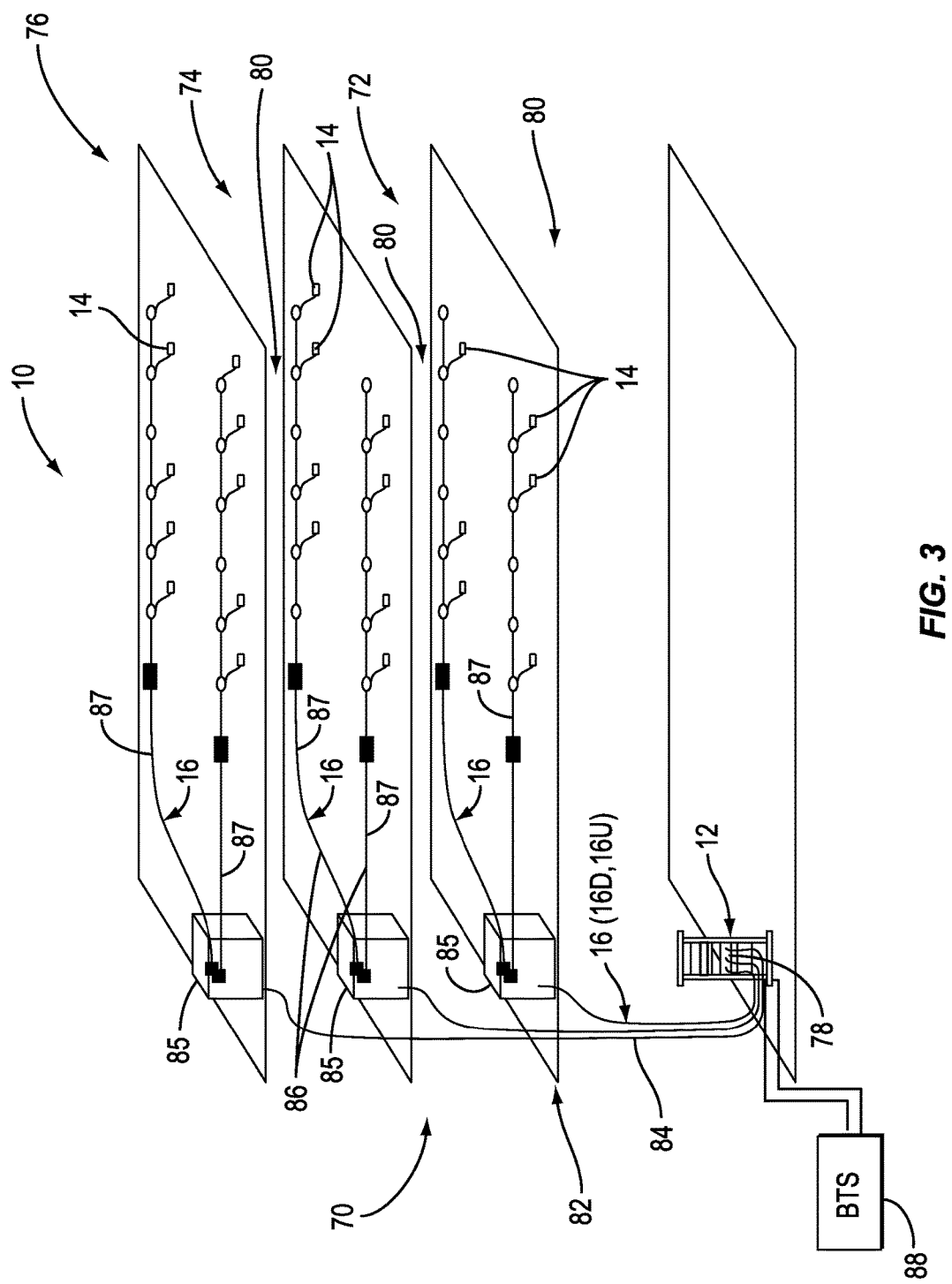
FIG. 3 is a partially schematic cut-away diagram of an exemplary building infrastructure in which the wireless infrastructure in FIG. 1 can be employed.

FIG. 3 is a partially schematic cut-away diagram of a building infrastructure 70 employing an optical fiber-based DAS. The DAS 10 incorporates the HEU 12 to provide various types of communication services to coverage areas within the building infrastructure 70. The DAS 10 is configured to receive wireless RF communications signals and convert the signals into RoF signals to be communicated over the optical fiber 16 to multiple RAUs 14 to provide wireless services inside the building infrastructure 70. The building infrastructure 70 includes a first (ground) floor 72, a second floor 74, and a third floor 76. The floors 72, 74, 76 are serviced by the HEU 12 through a main distribution frame 78 to provide antenna coverage areas 80 in the building infrastructure 70. A main cable 82 has a number of different sections that facilitate the placement of a large number of RAUs 14 in the building infrastructure 70. Each RAU 14 in turn services its own coverage area in the antenna coverage areas 80. The main cable 82 can include, for example, a riser cable 84 that carries all of the downlink and uplink optical fibers 16D, 16U to and from the HEU 12. The riser cable 84 may be routed through an interconnect unit (ICU) 85. The ICU 85 may be provided as part of or separate from the power supply 54 in FIG. 2. The ICU 85 may also provide power to the RAUs 14 via the electrical power line 58 (FIG. 2) and provided inside an array cable 87.

An RF source such as a base transceiver station (BTS) 88, which may be provided by a second party such as a cellular service provider, is connected to the HEU 12. A BTS is any station or source that provides an input signal to the HEU 12 and can receive a return signal from the HEU 12. In a typical cellular system, for example, a plurality of BTSs are deployed at a plurality of remote locations to provide wireless telephone coverage. Each BTS serves a corresponding cell and when a mobile station enters the cell, the BTS communicates with the mobile station. The DAS 10 in FIGS. 1-3 provides point-to-point communications between the HEU 12 and the RAU 14. Each RAU 14 communicates with the HEU 12 over a distinct downlink and uplink optical fiber pair to provide the point-to-point communications. Multiple downlink and uplink optical fiber pairs can be provided in a fiber optic cable to service multiple RAUs 14 from a common fiber optic cable. The DAS can support a wide variety of radio sources, such as Long Term Evolution (LTE), US Cellular (CELL), Global System for Mobile Communications (GSM), Code Division Multiple Access (CDMA), Time Division Multiple Access (TDMA), Advanced Wireless Services (AWS), iDEN (e.g., 800 Mega-Hertz (MHz), 900 MHz, and 1.5 GHz), etc. These radios sources can range from 400 MHz to 2700 MHz as an example.

Figure 4:
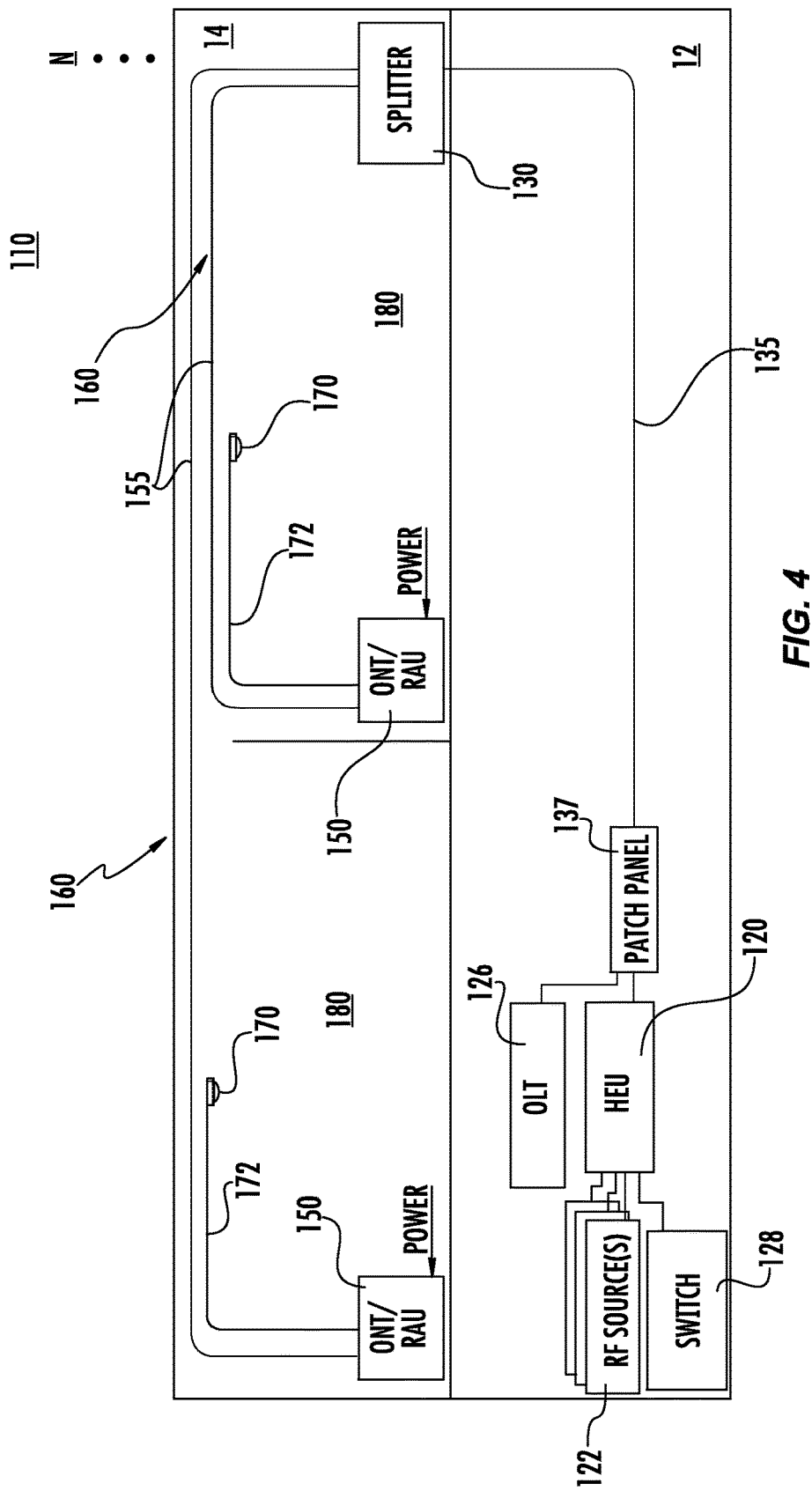
FIG. 4 is a schematic diagram of an exemplary optical fiber-based wireless infrastructure in which antenna unit and ONT functionalities are collocated.

FIG. 4 is a schematic diagram of a generalized embodiment of wireless system, in the form of an optical fiber-based distributed antenna system 110. In this embodiment, the optical fiber-based wireless system 110 is configured to create one or more coverage areas in a building infrastructure. The building infrastructure comprises multiple stories, including a first floor 112, which can be, for example, a ground or basement floor, a second floor 114, and N additional floors (not illustrated). According to one aspect, remote antenna unit (RAU) and optical network terminal (ONT) functionalities are collocated at a remote unit. According to another aspect, power for the remote unit can be provided 'locally', such as at the coverage area of the remote unit.

The components and operation of the system 110 in providing RF communications and data services can otherwise be generally similar to the embodiment shown in FIGS. 1-3. For example, the optical fiber-based wireless system 110 includes a head-end unit (HEU) 120 adapted to perform or to facilitate any one of a number of RoF applications, such as radio frequency (RF) identification (RFID), wireless local-area network (WLAN) communication, cellular phone services, etc., as in the HEU 12 illustrated in FIG. 3. The HEU 120 can be connected to one or more RF sources 122, such as a base transceiver station (BTS) through an interface, integral with a BTS, or otherwise in communication with a BTS, to receive downlink electrical RF signals from the BTS 122 and to transmit RF signals to the BTS 122.

The HEU 120 can also be connected to an optical line terminal 126 (OLT), and a switch 128, such as an Ethernet switch, to provide additional services to the building infrastructure. The HEU 120 is connected to a splitter 130 by a cable 135 and a patch panel 137. The cable 135 can be, for example, a riser cable having one or more optical fibers. According to one aspect of the present embodiment, the splitter 130 is connected to a plurality of ONT/remote antenna units ("ONT/RAU"), or simply, 'remote units' 150 by cables 155. The splitter 130 has least one input fiber and a plurality of output fibers, and is capable of routing optical RF data transmissions based on at least one of signal wavelength and polarization. The cables 135, 155 can be, for example, optical cables having one or more optical fibers. The cables 135, 155 can generally be referred to as 'optical communication paths', and the cables 135, 155, as well as the splitter 130, form optical communication paths 160 from the HEU 120 to the remote units 150. Additional transmission media, such as sections of optical cable, can be included in the optical transmission paths 160. A continuous fiber communication path may therefore extend from the each remote unit 150, through the splitter 130, back to the patch panel 137, and to the OLT 126 and the HEU 120.

The remote units 150 each include an uplink/downlink antenna system 170 connected by cable 172, which can be, for example, an electrically conductive coaxial cable. The antenna systems 170 provide uplink/downlink for RF communication, data, etc. service signals in a coverage area 180. The remote units 150 can include the components and functionalities of the RAUs 14 illustrated in FIGS. 1-3, For example, the remote units 150 may include an optical-to-electrical (O/E) converter to convert received downlink optical RF communications signals to electrical RF communications signals to be communicated wirelessly through the antenna system 170 to client devices in its coverage area. Similarly, the antenna system 170 receives wireless RF communications from client devices and communicates electrical RF communications signals representing the wireless RF communications to an E/O converter in the remote units 150. The E/O converter converts the electrical RF communications signals into uplink optical RF communications signals to be communicated to an O/E converter provided in the HEU 120 for further transmission by the HEU. The remote units 150 also include an ONT component effective to terminate one or more fiber optic lines, demultiplex optical signals into their component parts (e.g., voice telephone, television, and Internet), and to provide electrical power.

In the illustrated embodiment, each coverage area or service area 180 can coincide with, for example, an individual living unit in a multiple dwelling unit (MDU), or some other delineation between spaces in a building infrastructure, such as an office. At the remote units 150, the functionalities and hardware of a remote antenna unit and the ONT may be collocated and/or combined into a single chassis. Power for both the RAU and ONT components in the remote unit 150 can be provided at the desk (e.g., POL level) or living unit level (e.g., FTTH MDU), within the individual living unit, or other location where a network device is terminated and has power available. Power thus need not be provided at each floor in a wiring closet, IDF, etc., and conveyed over long lengths of cable resulting in electrical losses. Power is instead transmitted over electrically conductive network cables over relatively short distances. The remote unit 150 can be located, for example, such that it can be connected to a wall outlet in the living unit of an MDU, such that power for a remote unit 150 may be delivered from the coverage area of the remote unit.

Figure 5:
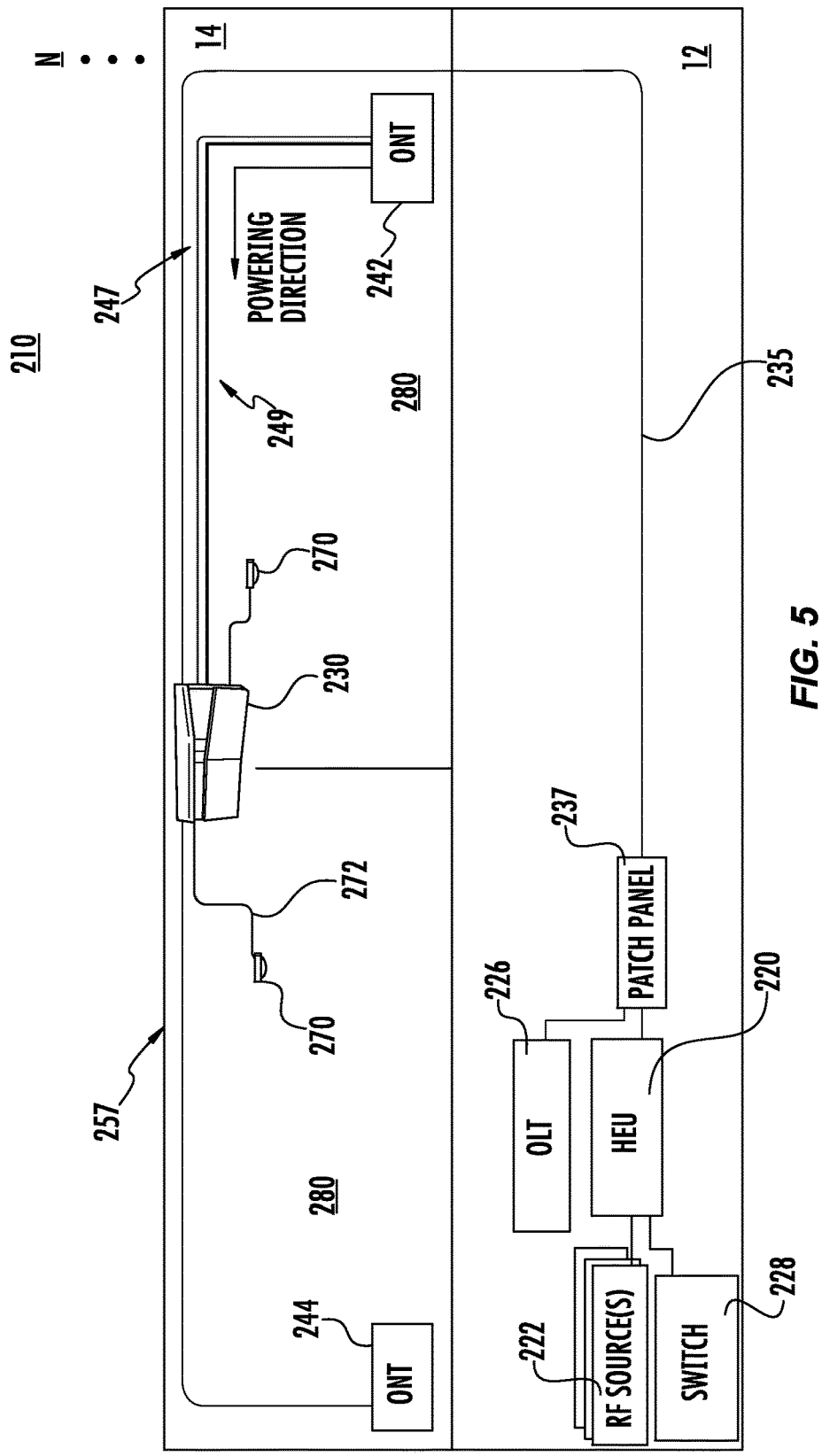
FIG. 5 is a schematic diagram of an exemplary optical fiber-based wireless infrastructure in which the antenna unit and splitter functionalities are collocated.

FIG. 5 is a schematic view of another embodiment of a wireless system, in the form of an optical fiber-based distributed antenna system 210. The building infrastructure comprises multiple stories, including a first floor 112, which can be a ground or basement floor, a second floor 114, and N additional floors (not illustrated). According to one aspect, remote antenna unit (RAU) and splitter functionalities are collocated, such as combined in a single chassis, frame and/or platform. According to another aspect, power for the remote unit can be provided locally, such as at a coverage area of the remote unit, or in one or more of the coverage areas of the remote unit.

The components and operation of the system 210 in providing RF communications and data services can otherwise be generally similar to the embodiment shown in FIGS. 1-3. For example, the optical fiber-based wireless system 210 includes an HEU 220 adapted to perform or to facilitate any one of a number of RoF applications, such as RFID, WLAN communication, cellular phone services, etc., as in the HEU 12 illustrated in FIG. 3. The HEU 220 can be connected to one or more RF sources 222, such as a BTS through an interface, integral with a BTS, or otherwise in communication with a BTS, to receive downlink electrical RF signals from the BTS 222 and to transmit RF signals to the BTS 222. The HEU 220 can also be connected to an OLT 226, and a switch 228, such as an Ethernet switch, to provide additional services to the building infrastructure.

The HEU 220 is connected to a remote antenna/splitter unit 230, or simply 'remote unit' 230, by a cable 235 and a patch panel 237. The cable 235 can be, for example, an optical transmission path comprising a cable or cables having one or more optical fibers suited for riser and/or horizontal (e.g. duct) deployments. In the illustrated embodiment, the cable 235 extends in sections vertically through the building as well as horizontally, and may be comprised of multiple sections joined, for example, at an interconnect unit (not illustrated).

According to one aspect of the present embodiment, the remote antenna/splitter unit, or remote unit 230 is connected to a first ONT 242 by a fiber path 247 and by an electrical path 249. The fiber path 247 can comprise, for example, a fiber optic cable with one or more optical fibers for transporting data. The electrical path 249 can comprise one or more electrical conductors for providing data and/or electrical power to the antenna/splitter unit 230. The fiber path 247 and the electrical path 249 can be combined, for example in a single, composite optical fiber/electrical cable having one or more optical and electrical conductors. The remote unit 230 can also be connected to a second ONT 244 by a fiber optic communication path 257. A continuous fiber communication path may therefore extend from the ONT 244, through the remote unit 230, back to the patch panel 237, and to the OLT 226 and the HEU 220. Similarly, a continuous fiber optical communication path may extend from the ONT 242, through the remote unit 230, back to the patch panel 237, and to the OLT 226 and the HEU 220.

The remote antenna/splitter unit 230 includes one or more uplink/downlink antenna systems 270 connected by cable 272, which can be, for example, an electrically conductive coaxial cable. Each antenna system 270 provides uplink/downlink for RF communicating service signals into a respective coverage area 280. The remote units 230 may include an optical-to-electrical (O/E) converter to convert received downlink optical RF communications signals to electrical RF communications signals to be communicated wirelessly through two or more antenna systems 270 to client devices in the respective coverage areas of the antenna systems. Similarly, each antenna system 270 receives wireless RF communications from client devices in its coverage area and communicates electrical RF communications signals representing the wireless RF communications to an E/O converter in the remote unit 230. The E/O converter converts the electrical RF communications signals into uplink optical RF communications signals to be communicated to an O/E converter provided in the HEU 220 for further transmission by the HEU. Because the remote unit 230 includes multiple antenna systems 270, it may include additional processing capabilities, converters etc., to accommodate the additional data and/or RF communications into multiple coverage areas.

The remote antenna/splitter unit 230 also includes at least one splitter component (not illustrated). The splitter component has least one input fiber and a plurality of output fibers, and is capable of routing optical RF data transmissions based on at least one of signal wavelength and polarization. Optical data signals entering an input fiber can be transmitted through one or more of the output fibers. Accordingly, the remote unit 230 can route RF and/or data transmissions (based on wavelength, polarization, or other factors) to the ONTs 242, 244, as well as multiple antenna systems 270, to provide service to multiple coverage areas 280 in multiple living units. In the illustrated embodiment, the exemplary remote unit 230 routes RF and/or data transmissions to two antenna systems 270, although three, four, or more antenna systems 270 can be provided with transmissions from the remote unit 230.

The combined antenna/splitter chassis consolidates the splitter function and antenna functions at a single location.

Accordingly, a single chassis, frame, or platform can be used to provide optical communications to the ONTs, and to provide RF signals for transmission to multiple antenna systems 270 in separate living units. In addition, the remote unit 230 can be located in the infrastructure where the power for the remote unit 230 can be provided from the ONT 242, or alternatively, from the ONT 244. The coverage areas 280 illustrated in FIG. 5 can be, for example, coverage areas corresponding to adjacent living or work spaces, such as in an MDU or office. Accordingly, antenna systems 270, as well as ONTs 242, 244, can be located in adjacent coverage areas and connected to a common remote unit 230.

Figure 6:
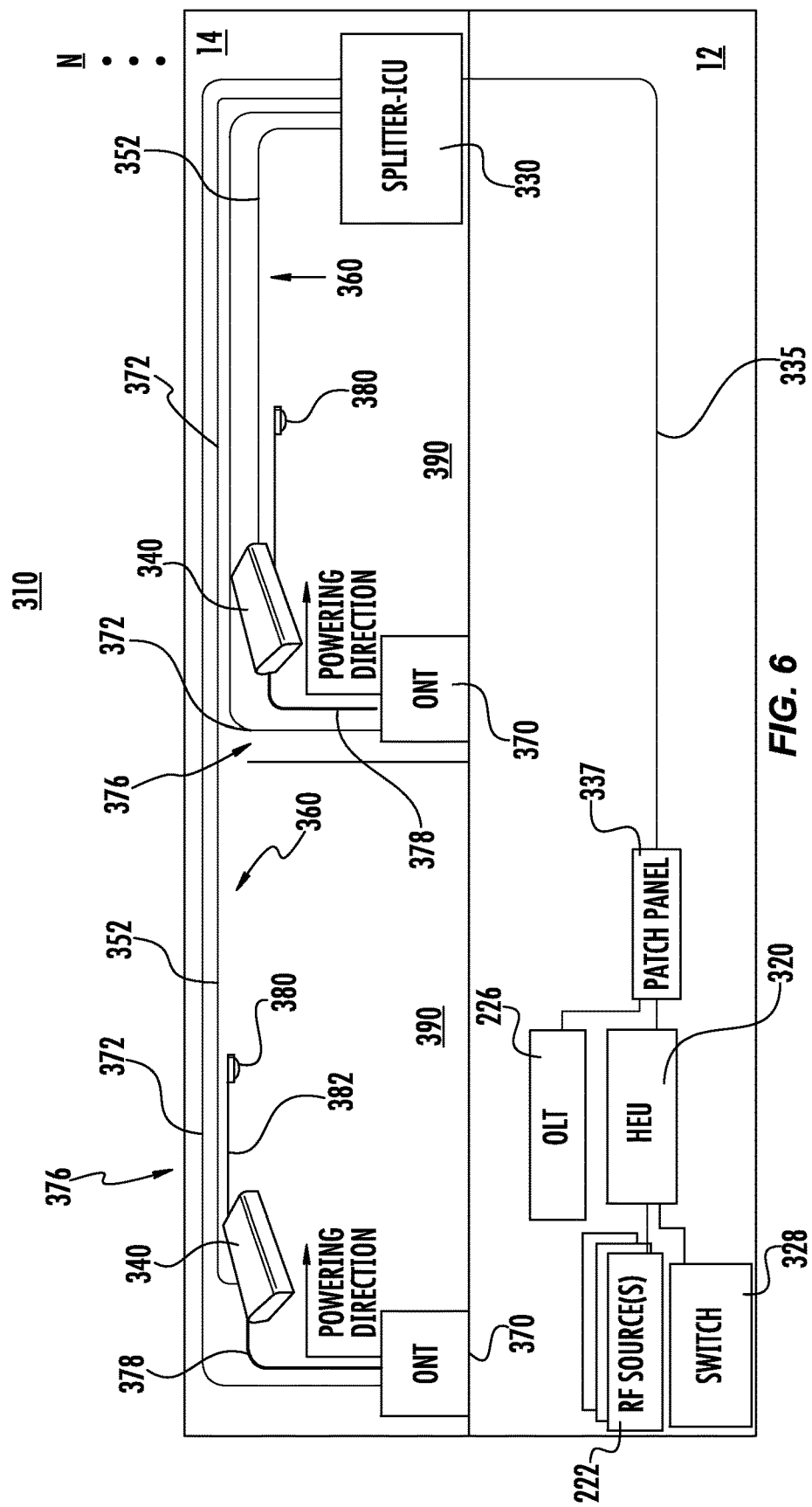
FIG. 6 is a schematic diagram of an exemplary optical fiber-based wireless infrastructure in which ONT and antenna functionalities are located proximate to one another and the antenna is powered from the ONT.

FIG. 6 is a schematic diagram of yet another generalized embodiment of wireless system, in the form of an optical fiber-based distributed antenna system 310. In this embodiment, the optical fiber-based wireless system 310 is configured to create one or more coverage areas in a building infrastructure. According to one aspect, a power cable may be run from an ONT to a nearby remote unit, thus eliminating the need for a composite cable and an interconnect unit (ICU) to inject electrical power for remote units on each floor. The components and operation of the system 310 in providing RF communications and data services can otherwise be generally similar to the embodiment shown in FIGS. 1-3. The HEU 320 can be connected to one or more RF sources 322, such as a base transceiver station (BTS) through an interface, integral with a BTS, or otherwise in communication with a BTS, to receive downlink electrical RF signals from the BTS 322 and to transmit RF signals to the BTS 322.

The HEU 120 can also be connected to an OLT 326, and a switch 328, such as an Ethernet switch, to provide additional services to the building infrastructure. The HEU 320 is connected to a splitter/fiber distribution component 330 by a cable 335 and a patch panel 337. The cable 335 can be, for example, a riser cable having one or more optical fibers. According to one aspect of the present embodiment, the splitter/fiber distribution component 330 is connected to a plurality of remote antenna units, or simply, 'remote units' 340 by cables 352. The cables 352 can be, for example, optical cables having one or more optical fibers. The cables 335, 352 can generally be referred to as 'optical communication paths', and the cables 335, 352, as well as the splitter/fiber distribution component 330, form optical communication paths 360 from the HEU 320 to each remote unit 340. Additional transmission media, such as sections of optical cable, can be included in the optical transmission paths 360. The splitter/fiber distribution component 330 has least one input fiber and a plurality of output fibers, and is capable of routing optical RF data transmissions based on at least one of signal wavelength and polarization.

The splitter/fiber distribution component 330 is also connected to a plurality ONTs 370 by cables 372. The cables 372 may be optical fiber cables, and the cables 372, along with the splitter/fiber distribution component 330 and the cable 335, form an optical communication path 376 from the HEU 320 to each ONT 370. Each ONT 370 can be electrically connected to a nearby remote unit 340 by an electrically conductive cable 378 having one or more electrical conductors.

As shown in FIG. 6, a continuous optical communication path is formed from each ONT 370, through the splitter/fiber distribution component 330, back to the patch panel 337, the HEU 320, and the OLT 326. Similarly, a continuous optical communication path is formed from each remote unit 340, through the splitter/fiber distribution component 330, back to the patch panel 337, the HEU 320, and the OLT 326.

According to one aspect, for the ONTs 370 and remote units 340 on a particular floor of the infrastructure, the ONT optical communication paths and remote unit optical communication path can run through a common splitter component. The splitter component need not be formed from a single optical splitter, but can be part of a group of collocated splitters. A single splitter component can alternatively connect to ONTs and remote units on multiple floors, such as on adjacent floors.

The remote units 340 each include an uplink/downlink antenna system 380 connected by cable 382, which can be, for example, an electrically conductive coaxial cable. The antenna systems 380 provide uplink/downlink for RF communication, data, etc. service signals in a coverage area 390. The remote units 340 may each include an optical-to-electrical (O/E) converter to convert received downlink optical RF communications signals to electrical RF communications signals to be communicated wirelessly through the antenna system 380 to client devices in its respective coverage area. Similarly, the antenna system 380 receives wireless RF communications from client devices and communicates electrical RF communications signals representing the wireless RF communications to an E/O converter in the remote units 340. The E/O converter converts the electrical RF communications signals into uplink optical RF communications signals to be communicated to an O/E converter provided in the HEU 320 for further transmission by the HEU.

The ONTs 370 are effective, for example, to terminate one or more fiber optic lines, and to demultiplex optical signals into their component parts (e.g., voice telephone, television, and Internet).

According to one aspect, the functionalities and hardware of a remote antenna unit and an optical network terminal are collocated, for example in a coverage area 390, so that the ONT 370 can power a nearby RAU 340 by an electrical cable. Therefore, there is no need to install a composite cable between an interconnect unit (ICU) at an intermediate distribution frame (IDF) and a remote unit. Power for the ONT, and thus the corresponding RAU, can be instead be provided at the desk (POL level) or living unit level (FTTH MDU), for each remote unit 340, within the individual living unit, office, commercial space, and similar infrastructure subdivisions. Power thus need not conveyed over long lengths of cable resulting in electrical losses.

In the embodiments illustrated in FIGS. 4-6, only a first floor 112 and a second floor 114 are illustrated. For each of the disclosed embodiments, it is to be understood that the arrangement on the second floor 114 may be repeated on N additional floors of the building, with the HEU servicing multiple floors. It should be further understood that while only two units (e.g., living unit, office unit, commercial unit, and other infrastructure subdivisions) with two coverage areas are shown for the second floor 114, three, four, or more living units can be included in any and all of the disclosed embodiments.

According to the various embodiments as disclosed in this specification, power for DAS components can be provided 'locally', such as from a coverage area of a DAS component, or an adjacent subdivision of a building infrastructure. Long power transmission distances from interconnect units (ICU) to DAS remote units can thus be reduced and/or eliminated. Because power need not be injected from an ICU, there is also no need for composite cable connections from an ICU to remote units as fiber only cables will suffice. The integration of ONT functions with DAS components also reduces installation by eliminating the need for parallel cable and hardware infrastructures. The footprint for hardware in IDF closets is also reduced.

In the illustrated embodiments, the wireless communication systems are described as adapted to receive RF communications from RF sources such as BTSs. Other signal sources can provide RF and other communication data to the illustrated wireless systems, including bidirectional amplifiers (BDA), Femtocells, etc.

While the computer-readable medium may be as a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding or carrying a set of instructions for execution.

The embodiments disclosed herein may be provided as a computer program product, or software, that may include a machine-readable medium (or computer-readable medium) having stored thereon instructions, which may be used to program a computer system (or other electronic devices) to perform a process according to the embodiments disclosed herein.

The various illustrative logical blocks, modules, and circuits described in connection with the embodiments disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A controller may be a processor.

The embodiments disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer-readable medium known in the art. An exemplary storage medium is coupled to the processor such that the processor can read information from, and write information to, the storage medium. In the alternative, the storage medium may be integral to the processor.

The terms "fiber optic cables" and/or "optical fibers" include all types of single mode and multi-mode light waveguides, including one or more optical fibers that may be upcoated, colored, buffered, ribbonized and/or have other organizing or protective structure in a cable such as one or more tubes, strength members, jackets or the like.

The antenna arrangements may include any type of antenna desired, including but not limited to dipole, monopole, and slot antennas. The distributed antenna systems that employ the antenna arrangements disclosed herein could include any type or number of communications mediums, including but not limited to electrical conductors, optical fiber, and air (i.e., wireless transmission). The distributed antenna systems may distribute and the antenna arrangements disclosed herein may be configured to transmit and receive any type of communications signals, including but not limited to RF communications signals and digital data communications signals, examples of which are described in U.S. patent application Ser. No. 12/892,424.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It will be apparent to those skilled in the art that various modifications and variations can be made without departing from the spirit or scope of the disclosure. Since modifications combinations, sub-combinations and variations of the disclosed embodiments incorporating the spirit and substance of the disclosure may occur to persons skilled in the art, the disclosure should be construed to include everything within the scope of the appended claims and their equivalents.

What is claimed is:

1. A wireless communication system deployed in a building infrastructure, the wireless communication system comprising:
    a head end unit configured to electronically receive and convert input electrical downlink radio frequency (RF) signals to optical downlink RF signals to be distributed on an input fiber;
    an optical line terminal (OLT) configured to receive and distribute optical multiplexed data signals on the input fiber;
    an optical network terminal (ONT) component configured to terminate one or more fiber optic lines and demultiplex the routed optical multiplexed data signals into component parts;
    a plurality of remote units each coupled to an output fiber among a plurality of output fibers and deployed over multiple floors of the building infrastructure;
    a splitter component configured to receive and route the optical downlink RF signals and the optical multiplexed data signals from the input fiber to the plurality of output fibers, wherein the splitter component is collocated with at least one of the plurality of remote units and wherein the collocated splitter component and remote unit is connected to the ONT component via an electrical path, the electrical path comprising one or more electrical conductors for providing electrical power from the ONT component to the collocated splitter component and remote unit;
    a plurality of optical cables coupling the head end unit to the plurality of remote units deployed over the multiple floors of the building infrastructure;
    a riser cable deployed between the head end unit and the splitter component;
    a plurality of optical fiber cables connecting the splitter component to the plurality of remote units; and
    a plurality of electrical power sources, one or more of the plurality of electrical power sources located separately from the plurality of remote units in a respective coverage area of one or more of the plurality of remote units, the plurality of electrical power sources configured to provide power for the one or more of the plurality of remote units, wherein:
    the head end unit is configured to:
        receive downlink RF signals from at least one RF source and to provide the downlink RF signals to the plurality of remote units; and
        return uplink RF signals received from the plurality of remote units back to the at least one RF source; and
    each remote unit among the plurality of remote units is configured to:

receive the routed optical downlink RF signals and the routed optical multiplexed data signals from the coupled output fiber among the plurality of output fibers;

convert the routed optical downlink RF signals to output electrical downlink RF signals; and receive power delivered from the one or more of the plurality of electrical power sources located separately from the remote unit in a respective coverage area of the remote unit to power the remote unit; and each remote unit comprises:

a remote antenna unit comprising an antenna system configured to distribute the output electrical downlink RF signals into the respective coverage area of the remote unit, wherein each antenna system is configured to receive uplink RF signals from a respective coverage area.

2. The wireless communication system of claim 1, wherein the wireless communication system comprises a remote unit for each of a plurality of delineated spaces in the building infrastructure, and wherein the wireless communication system comprises a plurality of electrical power sources not located in any of the plurality of remote units, and wherein a respective one of the plurality of electrical power sources is associated with each of the plurality of delineated spaces and is configured to deliver power to a respective remote unit in a respective one of the plurality of delineated spaces.

3. The wireless communication system of claim 1, wherein each remote unit includes an optical-to-electrical converter configured to convert the received optical downlink RF signals to the output electrical downlink RF signals to be communicated wirelessly through the antenna system of the remote unit.

4. The wireless communication system of claim 3, further comprising the at least one RF source connected to the head end unit and providing the input electrical downlink RF signals to the head end unit.

5. The wireless communication system of claim 1, wherein at least one of the plurality of remote units is deployed in a ceiling of a living unit.

6. The wireless communication system of claim 1, wherein the splitter component is configured to route the optical downlink RF signals and the optical multiplexed data signals based on wavelength or polarization.

7. The wireless communication system of claim 1, wherein the plurality of remote units includes at least five remote units.

8. The wireless communication system of claim 2, wherein the respective coverage area corresponds to an individual delineated space of the plurality of delineated spaces within the building infrastructure, and wherein the one or more of the plurality of electrical power sources comprises an electrical power source located in the individual delineated space within the building infrastructure and configured to provide power for both the remote antenna unit and the ONT component of at least one of the plurality of remote units over an electrically conductive network cable connecting the one or more of the plurality of electrical power sources and the at least one of the plurality of remote units.

9. The wireless communication system of claim 8, wherein the at least one of the plurality of remote units is connected to a wall outlet located in the individual delineated space of the building infrastructure, and the ONT component and the remote antenna unit of the at least one of the plurality of remote units are configured to receive power from the wall outlet over the electrically conductive network cable.

10. A wireless communication system, comprising:

a head end unit configured to electronically receive and convert input electrical downlink radio frequency (RF) signals to optical downlink RF signals to be distributed on an optical communication path;

an optical line terminal (OLT) configured to receive and distribute optical multiplexed data signals on the optical communication path;

at least one optical network terminal (ONT) component located proximate to at least one remote antenna unit and configured to demultiplex the optical multiplexed data signals into component parts; and a plurality of remote units each coupled to the head end unit and the OLT by the optical communication path to receive the optical downlink RF signals and the optical multiplexed data signals from the head end unit and the OLT, each remote unit of the plurality of remote units configured to receive power delivered from an electrical power source located in a respective coverage area of one or more of the plurality of the remote units, wherein each remote unit comprises:

an optical-to-electrical converter configured to convert the received optical downlink RF signals to output electrical downlink RF signals; and a remote antenna unit comprising an antenna system configured to distribute the output electrical downlink RF signals into a respective coverage area of the remote unit;

wherein the wireless communication system further comprises an electrically conductive cable connecting the at least one ONT component to at least one remote antenna unit of at least one of the plurality of remote units, the electrically conductive cable configured to provide power from the at least one ONT component to the at least one remote antenna unit, and wherein the head end unit is configured to receive input electrical downlink RF signals from at least one RF source.

11. The wireless communication system of claim 10, wherein the wireless communication system comprises a remote unit for each of a plurality of delineated spaces in a building infrastructure, and wherein the wireless communication system comprises a plurality of electrical power sources not located in any of the plurality of remote units, and wherein a respective one of the plurality of electrical power sources is associated with each of the plurality of delineated spaces and is configured to deliver power to a respective remote unit in a respective one of the plurality of delineated spaces.

12. The wireless communication system of claim 11, wherein the plurality of remote units comprises at least five remote units deployed on multiple floors of the building infrastructure, and wherein the wireless communication system comprises an electrical power source for each remote unit being located in the respective one of the plurality of delineated spaces for the respective remote unit.

13. The wireless communication system of claim 11, wherein the optical communication path comprises at least one splitter component with at least one input fiber and a plurality of output fibers, the at least one splitter component being capable of routing the optical downlink RF signals and the optical multiplexed data signals based on wavelength or polarization.

14. The wireless communication system of claim 13, further comprising a plurality of electrically conductive cables connecting the at least one ONT component to respective electrical power sources, whereby the at least one ONT component provides power received from the respective electrical power sources to one or more of the plurality of remote units.

15. The wireless communication system of claim 14, wherein the optical communication path includes:
- a riser cable deployed between the head end unit and the at least one splitter component; and
- a plurality of optical fiber cables connecting the at least one splitter component to the plurality of remote units, wherein each remote unit is coupled to the at least one splitter component by at least one optical fiber communication path.

\* \* \* \* \*